United States Patent
Tan et al.

(10) Patent No.: US 10,965,554 B2
(45) Date of Patent: Mar. 30, 2021

(54) DATA PROCESSING METHOD AND RELATED DEVICE, AND SYSTEM

(71) Applicant: Huawei Technologies Co., Ltd., Shenzhen (CN)

(72) Inventors: Weiguo Tan, Shenzhen (CN); Fangshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/126,056

(22) Filed: Sep. 10, 2018

(65) Prior Publication Data
US 2018/0367423 A1    Dec. 20, 2018

Related U.S. Application Data

(63) Continuation of application No. PCT/CN2017/073376, filed on Feb. 13, 2017.

(30) Foreign Application Priority Data

Mar. 10, 2016    (CN) .......................... 201610136091.0

(51) Int. Cl.
*H04L 12/26* (2006.01)
*G06F 16/28* (2019.01)
(Continued)

(52) U.S. Cl.
CPC ........ *H04L 43/022* (2013.01); *G06F 16/2465* (2019.01); *G06F 16/285* (2019.01);
(Continued)

(58) Field of Classification Search
CPC ... H04L 43/022; H04L 67/42; H04L 67/2828; G06F 16/285; G06F 16/2465; G06F 2216/03; G06N 7/005
See application file for complete search history.

(56) References Cited

U.S. PATENT DOCUMENTS

| 7,761,425 B1 | 7/2010 | Erickson et al. |
| 8,781,442 B1 | 7/2014 | Link, II |
| (Continued) | | |

FOREIGN PATENT DOCUMENTS

| CN | 101454781 A | 6/2009 |
| CN | 102868765 A | 1/2013 |
| (Continued) | | |

OTHER PUBLICATIONS

Xiao, Han, et al., "Learning Better while Sending Less: Communication-Efficient Online Semi-Supervised Learning in Client-Server Settings", 2015 IEEE International Conference on Data Science and Advanced Analytics (DSAA), Paris, Prance, Oct. 19-21, 2015, 10 pages.

*Primary Examiner* — Azizul Choudhury
(74) *Attorney, Agent, or Firm* — Slater Matsil, LLP

(57) ABSTRACT

A data processing method, a related device and a system are disclosed. In an embodiment, a data processing method includes generating, by a client, a data digest for a stored data set, and sending the data digest to a server, wherein the data digest is used to trigger the server to determine, according to the data digest, feedback information for the client, receiving, by the client, the feedback information sent by the server, when the feedback information comprises a target data selection policy and a target policy parameter, determining, by the client, a data subset from the data set according to the target data selection policy and the target policy parameter, wherein the target policy parameter is used to limit a quantity of pieces of data in the data subset, and sending, by the client, the data subset to the server.

20 Claims, 13 Drawing Sheets

(51) Int. Cl.
  *G06F 16/2458* (2019.01)
  *H04L 29/08* (2006.01)
  *G06N 7/00* (2006.01)
  *H04L 29/06* (2006.01)
(52) U.S. Cl.
  CPC ............ *G06N 7/005* (2013.01); *H04L 29/08* (2013.01); *H04L 67/06* (2013.01); *H04L 67/1095* (2013.01); *H04L 67/2828* (2013.01); *G06F 2216/03* (2013.01); *H04L 67/32* (2013.01); *H04L 67/42* (2013.01)

(56) References Cited

U.S. PATENT DOCUMENTS

| | | | | |
|---|---|---|---|---|
| 2001/0011301 | A1* | 8/2001 | Sato | H04L 29/06027 709/219 |
| 2004/0085323 | A1 | 5/2004 | Divakaran et al. | |
| 2005/0198326 | A1* | 9/2005 | Schlimmer | H04L 67/2852 709/229 |
| 2012/0047284 | A1* | 2/2012 | Tarkoma | H04L 67/06 709/247 |
| 2012/0323895 | A1 | 12/2012 | Fontes et al. | |
| 2014/0143446 | A1* | 5/2014 | Jacobson | G06F 16/178 709/248 |
| 2015/0003808 | A1* | 1/2015 | Rajagopalan | G11B 27/36 386/248 |
| 2015/0195379 | A1* | 7/2015 | Zhang | G06F 16/9577 709/219 |
| 2015/0324419 | A1* | 11/2015 | Aronovich | G06F 3/0641 707/692 |
| 2016/0269361 | A1 | 9/2016 | Wang et al. | |

FOREIGN PATENT DOCUMENTS

| | | |
|---|---|---|
| CN | 102915347 A | 2/2013 |
| CN | 103812961 A | 5/2014 |
| CN | 104199815 A | 12/2014 |
| CN | 104794239 A | 7/2015 |
| WO | 2015167772 A1 | 11/2015 |

* cited by examiner

DATA PROCESSING METHOD AND RELATED DEVICE, AND SYSTEM

CROSS-REFERENCE TO RELATED APPLICATIONS

This application is a continuation of International Patent Application No. PCT/CN2017/073376 filed on Feb. 13, 2017, which claims priority to Chinese Patent Application No. 201610136091.0 filed on Mar. 10, 2016, the disclosures of which are hereby incorporated by reference in their entireties.

TECHNICAL FIELD

The present invention relates to the field of data processing technologies, and in particular, to a data processing method and a related device, and a system.

BACKGROUND

Data mining refers to a process of searching for hidden information in massive data by using an algorithm. The data mining is implemented by using methods such as statistics, analysis processing, information retrieval, machine learning, and pattern recognition. For example, a prediction model is obtained by means of learning according to a short message service message text with a labeled short message service message type (such as a spam short message service message and a normal short message service message), and a type of a new short message service message text is automatically recognized based on the model. This is a data mining process.

Currently, the data mining is usually a scenario based on a client-server architecture. For example, a prediction model in which a smart band automatically recognizes a current user behavior mode (such as walking, cycling, and swimming) is learned in a server and synchronized to the smart band. The band needs to constantly transmit new data to the server, so that the server constantly updates the prediction model to obtain a more accurate model. For another example, a prediction model in which an intelligent transportation surveillance camera automatically identifies a vehicle violation (such as driving ignoring a red light, driving against the traffic, and a violated lane-change) is learned in a server and synchronized to the camera. The camera needs to constantly transmit new data to the server, so that the server constantly updates the prediction model to obtain a more accurate model. However, because the client needs to constantly transmit new data to the server, the server needs to process massive data, and consequently, consumption of resources such as bandwidth, traffic, power consumption, or a computing capability is large. Therefore, the question arises how to reduce resource consumption in a data processing process.

SUMMARY

Embodiments of the present invention disclose a data processing method, a related device, and a system for reducing resource consumption in a data processing process.

A first aspect of the embodiments of the present invention discloses a data processing method, including generating, by a client, a data digest for a stored data set, and sending the data digest to a server, where the data digest is used to trigger the server to determine, according to the data digest, feedback information for the client, receiving, by the client, the feedback information sent by the server, when the feedback information includes a target data selection policy and a target policy parameter, determining, by the client, a data subset from the data set according to the target data selection policy and the target policy parameter, where the target data selection policy is used to indicate a manner in which the client selects data, and the target policy parameter is used to limit a quantity of pieces of the selected data in the data subset and sending, by the client, the data subset to the server. In this way, an amount of data transmitted by the client to the server can be controlled. Hence, resource consumption in a data processing process is effectively reduced, and in addition, representative data can be accurately and conveniently selected, so as to obtain a more accurate prediction model.

With reference to the first aspect of the embodiments of the present invention, in a first possible implementation of the first aspect of the embodiments of the present invention, when the feedback information includes information that is used to instruct the client to forbid data upload, the method further includes responding, by the client, to the feedback information and forbidding sending data to the server. The client may clear, according to a requirement, data that does not need to be sent, so as to release storage space of the client.

With reference to the first aspect of the embodiments of the present invention or the first possible implementation of the first aspect, in a second possible implementation of the first aspect of the embodiments of the present invention, the method further includes calculating, by the client, similarity between the data digest and at least one historical data digest, determining, by the client, whether similarity exceeding a preset threshold exists in the calculated similarity and when no similarity exceeding the preset threshold exists in the calculated similarity, performing, by the client, the step of sending the data digest to the server. In this way, sending similar data digests to the server for multiple times can be avoided, and unnecessary data sending can be reduced.

With reference to the first aspect of the embodiments of the present invention or the first or the second possible implementation of the first aspect, in a third possible implementation of the first aspect of the embodiments of the present invention, when the data set includes multiple types of data, generating, by a client, a data digest for a stored data set includes generating, by the client, data digest subsets corresponding to each type of data, and combining the data digest subsets corresponding to each type of data into the data digest.

With reference to any one of the first aspect of the embodiments of the present invention or the first to the third possible implementations of the first aspect, in a fourth possible implementation of the first aspect of the embodiments of the present invention, the target data selection policy may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like.

With reference to the fourth possible implementation of the first aspect of the embodiments of the present invention, in a fifth possible implementation of the first aspect of the embodiments of the present invention, when the target data selection policy is the selection policy based on a confidence level, the target policy parameter is a confidence level threshold, and determining, by the client, a data subset from the data set according to the target data selection policy and the target policy parameter includes calculating, by the client, a confidence level of data in the data set according to a prediction model sent by the server and extracting, by the client from the data set, data whose confidence level is less than the confidence level threshold, and combining the data into the data subset.

With reference to the fourth possible implementation of the first aspect of the embodiments of the present invention, in a sixth possible implementation of the first aspect of the embodiments of the present invention, when the target data selection policy is the sampling selection policy, the target policy parameter is a sampling proportion, and determining, by the client, a data subset from the data set according to the target data selection policy and the target policy parameter includes determining, by the client, a sampling quantity of pieces of data in the data set according to the sampling proportion and extracting, by the client, the sampling quantity of pieces of data from the data set, and combining the data into the data subset.

With reference to the fourth possible implementation of the first aspect of the embodiments of the present invention, in a seventh possible implementation of the first aspect of the embodiments of the present invention, when the target data selection policy is the clustering-based selection policy, the target policy parameter is a quantity of clustered groups, and determining, by the client, a data subset from the data set according to the target data selection policy and the target policy parameter includes determining, by the client, a to-be-uploaded quantity of pieces of data in the data set according to the quantity of the clustered groups and selecting, by the client, the to-be-uploaded quantity of pieces of data from the data set, and combining the data into the data subset.

With reference to the seventh possible implementation of the first aspect of the embodiments of the present invention, in an eighth possible implementation of the first aspect of the embodiments of the present invention, when the client generates new data, the method further includes obtaining, by the client from the data subset, all target data of which a generation time has an interval that is less than a preset time interval and that is from a generation time of the new data, calculating, by the client, similarity between all target data and the new data to obtain maximum similarity and target data corresponding to the maximum similarity, determining, by the client, whether the maximum similarity is greater than a preset threshold and when the maximum similarity is greater than the preset threshold, replacing, by the client, the target data corresponding to the maximum similarity with the new data, so as to obtain a first data subset, where sending, by the client, the data subset to the server includes sending, by the client, the first data subset to the server.

With reference to the eighth possible implementation of the first aspect of the embodiments of the present invention, in a ninth possible implementation of the first aspect of the embodiments of the present invention, the method further includes when no target data exists or the maximum similarity is not greater than the preset threshold, adding, by the client, the new data into the data subset to obtain a second data subset, where sending, by the client, the data subset to the server includes sending, by the client, the second data subset to the server.

A second aspect of the embodiments of the present invention discloses a data processing method, including receiving, by a server, data digests sent by one or more clients, determining, by the server from the one or more clients according to the data digests, a target client that is allowed to upload data, determining, by the server, a target data selection policy according to a data digest corresponding to the target client, and determining a target policy parameter according to the data digest corresponding to the target client and the target data selection policy, sending, by the server, the target data selection policy and the target policy parameter to the target client, so that the target client determines a to-be-transmitted data subset according to the target data selection policy and the target policy parameter, where the target data selection policy is used to indicate a manner in which the target client selects data, and the target policy parameter is used to limit a quantity of pieces of the selected data in the data subset and receiving, by the server, the data subset sent by the target client, and establishing a prediction model or updating an existing prediction model according to the data subset. In this way, an amount of data transmitted by the client to the server can be controlled. Therefore, resource consumption of the server in a data processing process is effectively reduced, and in addition, representative data can be accurately and conveniently selected, so as to obtain a more accurate prediction model.

With reference to the second aspect of the embodiments of the present invention, in a first possible implementation of the second aspect of the embodiments of the present invention, the method further includes sending, by the server, feedback information to a remaining client in the one or more clients except the target client, where the feedback information is used to instruct the remaining client in the one or more clients except the target client to forbid sending data to the server. The client may clear, according to a requirement, data that does not need to be sent, so as to release storage space of the client.

With reference to the second aspect or the first possible implementation of the second aspect, in the second possible implementation of the second aspect of the embodiments of the present invention, determining, by the server from the one or more clients according to the data digests, a target client that is allowed to upload data includes classifying, by the server, the one or more clients into multiple groups according to the data digests and selecting, by the server, at least one client from each of the multiple groups, and using the at least one client selected from each group as the target client that is allowed to upload data. In this way, a concurrent amount of data transmitted by the client to the server can be significantly reduced.

With reference to the second aspect of the embodiments of the present invention or the first or the second possible implementation of the second aspect, in a third possible implementation of the second aspect of the embodiments of the present invention, determining, by the server, a target policy parameter according to the data digest corresponding to the target client and the target data selection policy includes generating, by the server, a data digest corresponding to the server for a stored data set, calculating, by the server, similarity between the data digest corresponding to the server and the data digest corresponding to the target client, and converting, by the server, the similarity into the target policy parameter according to a conversion function corresponding to the target data selection policy.

With reference to the second aspect of the embodiments of the present invention or the first or the second possible implementation of the second aspect, in a fourth possible implementation of the second aspect of the embodiments of the present invention, determining, by the server, a target data selection policy according to a data digest corresponding to the target client includes calculating, by the server, model variation amplitudes under different data selection policies by using the data digest corresponding to the target client, and according to a pre-established correspondence among a model variation amplitude, a historical data digest, and a data selection policy and obtaining, by the server, a data selection policy corresponding to a maximum model variation amplitude in the calculated model variation amplitudes under the different data selection policies, and using the data selection policy as the target data selection policy.

With reference to the fourth possible implementation of the second aspect of the embodiments of the present invention, in a fifth possible implementation of the second aspect of the embodiments of the present invention, determining, by the server, a target policy parameter according to the data digest corresponding to the target client and the target data selection policy includes determining, by the server, the target policy parameter by using the maximum model variation amplitude and according to a correspondence between a model variation amplitude and a policy parameter under the target data selection policy.

With reference to any one of the second aspect of the embodiments of the present invention or the first to the fifth possible implementations of the second aspect, in a sixth possible implementation of the second aspect of the embodiments of the present invention, the target data selection policy may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like.

A third aspect of the embodiments of the present invention discloses a client, where the client includes a module configured to implement any possible implementation in the method disclosed in the first aspect of the embodiments of the present invention.

A fourth aspect of the embodiments of the present invention discloses a server, where the server includes a module configured to implement any possible implementation in the method disclosed in the second aspect of the embodiments of the present invention.

A fifth aspect of the embodiments of the present invention discloses a computer readable storage medium, where the computer readable storage medium stores executable program code, and the program code is used to implement some or all of steps in the method disclosed in the first aspect of the embodiments of the present invention.

A sixth aspect of the embodiments of the present invention discloses a computer readable storage medium, where the computer readable storage medium stores executable program code, and the program code is used to implement some or all of steps in the method disclosed in the second aspect of the embodiments of the present invention.

A seventh aspect of the embodiments of the present invention discloses a client, where the client includes a processor, a memory, a communications interface, and a bus. The processor, the memory, and the communications interface are connected by using the bus. The memory is configured to store an instruction, the processor is configured to execute the instruction, and the communications interface is configured to communicate with a server under control of the processor. When the processor executes an instruction stored in the memory, the processor performs the method disclosed in the first aspect of the embodiments of the present invention and any possible implementation of the method.

An eighth aspect of the embodiments of the present invention discloses a server, where the server includes a processor, a memory, a communications interface, and a bus. The processor, the memory, and the communications interface are connected by using the bus. The memory is configured to store an instruction, the processor is configured to execute the instruction, and the communications interface is configured to communicate with a client under control of the processor. When the processor executes an instruction stored in the memory, the processor performs the method disclosed in the second aspect of the embodiments of the present invention and any possible implementation of the method.

A ninth aspect of the embodiments of the present invention discloses a data processing system, where the data processing system includes at least one client that is disclosed in the third aspect of the embodiments of the present invention and at least one server that is disclosed in the fourth aspect of the embodiments of the present invention.

In the embodiments of the present invention, the client generates the data digest for the stored data set and sends the data digest to the server; and the server determines the feedback information for the client according to the data digest and sends the feedback information to the client. When the feedback information received by the client includes the target data selection policy and the target policy parameter, the client may determine the data subset from the data set according to the target data selection policy and the target policy parameter and send the data subset to the server. The server may establish the prediction model or update the existing prediction model according to the data subset. It can be learned that during implementation of the embodiments of the present invention, before the client selects data and sends the data to the server, the client generates a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption in a data processing process can be effectively reduced. In addition, representative data can be accurately and conveniently selected, so as to obtain a more accurate prediction model.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The embodiments of the present invention disclose a data processing method and a related device, and a system, so as to accurately and conveniently select representative data to obtain a more accurate prediction model, and effectively reduce an amount of data transmitted by a client to a server. Details are separately described in the following.

Figure 1:
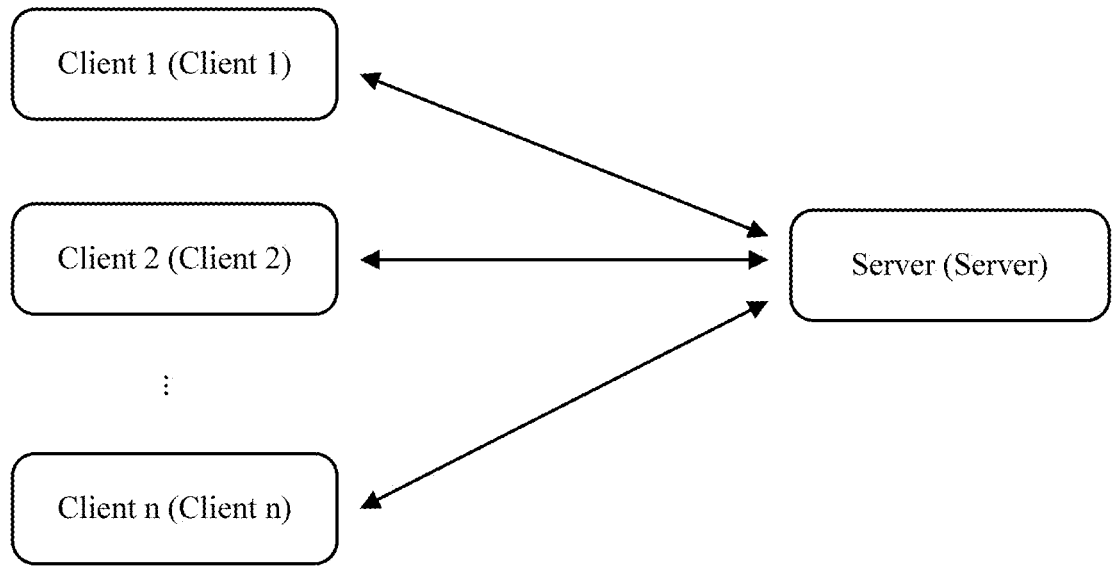
FIG. 1 is a schematic diagram of a C/S structure-based network architecture disclosed in an embodiment of the present invention.

For a better understanding of the embodiments of the present invention, a C/S structure-based network architecture disclosed in the embodiments of the present invention is first described below. Referring to FIG. 1, FIG. 1 is a schematic diagram of a C/S structure-based network architecture disclosed in an embodiment of the present invention. The network architecture shown in FIG. 1 is based on a client/server (C/S) structure, and may be used for data processing such as data mining. The network architecture shown in FIG. 1 may include at least one client and a server. The client may include various devices such as a smartphone, a tablet computer, a palmtop computer, a personal digital assistant (PDA), a mobile Internet device (MID), a smart wearable device (such as a smart watch and a smart band), and an intelligent surveillance camera, and this is not limited in this embodiment of the present invention. The server may simultaneously support multiple clients, for example, a client 1, a client 2, . . . , and a client n, where n is a positive integer. The server may be a database server, which is mainly configured to process a data query request or a data control request, and may provide a user with services such as a query, an update, transaction management, caching, and multi-user access control.

In the network architecture shown in FIG. 1, a communication connection may be established in advance between the client and the server. Specifically, information may be transmitted between the client and the server by using a standard protocol, for example, the HTTP (Hypertext Transfer Protocol) protocol. Information may also be transmitted between the client and the server by using a dedicated protocol, for example, a sensor specific protocol. This is not limited in this embodiment of the present invention. In existing data mining, a client may constantly send data to a server, so that the server may establish a prediction model or update an existing prediction model in the server by using received data. However, because the client needs to constantly transmit new data to the server, the server needs to process massive data, and consequently, consumption of resources such as bandwidth, traffic, power consumption, or a computing capability is large. The client does not need to send data to the server when no new data is generated in the client or newly generated data is less valuable. In addition, when a quantity of clients connected to the server is relatively large, the server receives and processes data of multiple clients, causing excessively high load pressure (for example, an excessively large amount of data processed at a moment). Considering a deficiency in the prior art, in this embodiment of the present invention, before the client sends data to the server, the client generates a local data digest and sends the data digest to the server, and the server determines, according to the data digest, whether the client needs to send the data. Therefore, load pressure of the server can be effectively reduced. In addition, the server may further determine, according to the data digest, a data selection policy used by the client to select data and a policy parameter used to limit a quantity of pieces of selected data, so that an amount of data transmitted by the client to the server can be controlled, and resource consumption in a data processing process can be effectively reduced. In addition, representative data can be accurately and conveniently selected and sent to the server, so as to obtain a more accurate prediction model.

Figure 2:
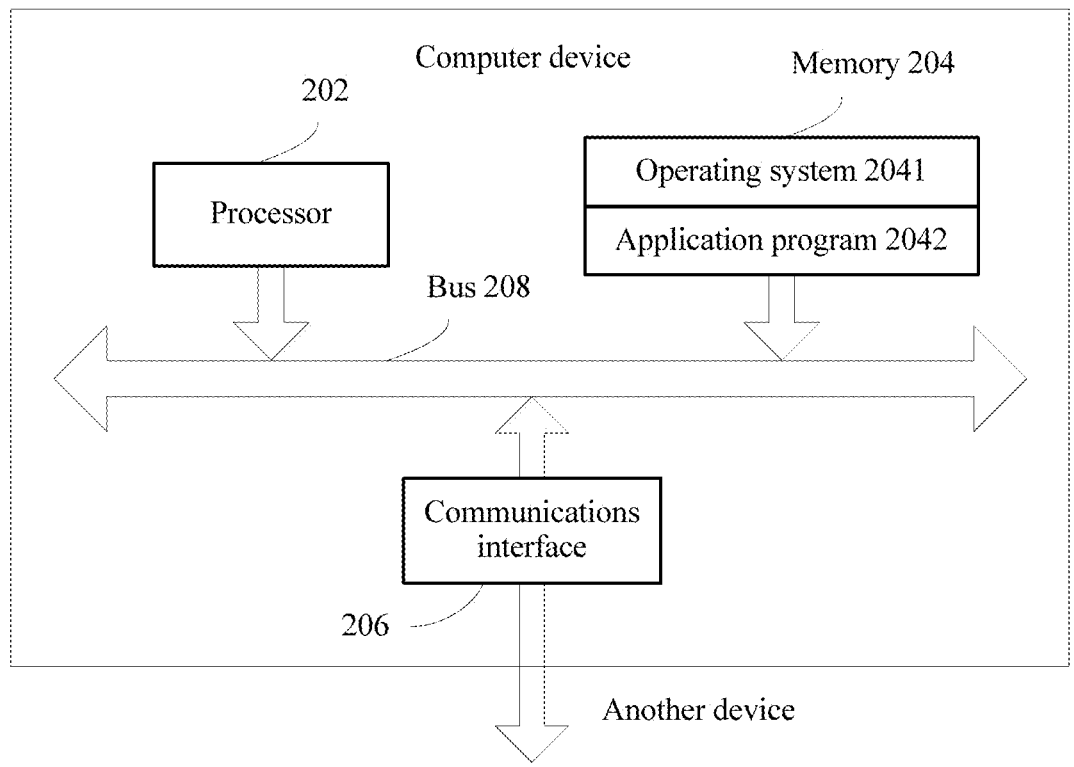
FIG. 2 is a schematic structural diagram of a computer device disclosed in an embodiment of the present invention.

Based on the network architecture shown in FIG. 1, embodiments of the present invention disclose a client and a server. Both the client and the server may be implemented in a form of a computer device. Referring to FIG. 2, FIG. 2 is a schematic structural diagram of a computer device disclosed in an embodiment of the present invention. As shown in FIG. 2, the computer device may include: a processor 202, a memory 204, a communications interface 206, and a bus 208. The processor 202, the memory 204, and the communications interface 206 implement mutual communication connections by using the bus 208. A person skilled in the art may understand that the structure of the computer device shown in FIG. 2 does not constitute a limitation on the present invention. The structure may not only be a bus structure, but may also be a star structure, and may further include more or fewer components than those shown in FIG. 2, or combine some parts, or have different parts arrangements.

The processor 202 may be a general central processing unit (CPU), a microprocessor, an application-specific integrated circuit (ASIC), or one or more integrated circuits, and is configured to execute a related program, so as to implement the technical solution provided in this embodiment of the present invention.

The memory 204 may be a read-only memory (ROM), a static storage device, a dynamic storage device, or a random access memory (RAM). The memory 204 may store an operating system 2041 and another application program 2042. When the technical solutions provided in the embodiments of the present invention are implemented by using software or firmware, program code used to implement the technical solutions provided in the embodiments of the present invention is stored in the memory 204, and is executed by the processor 202.

The communications interface 206 uses, for example, without limitation, a transceiving apparatus such as a transceiver, so as to implement communication with another device or communications network.

The bus 208 may include a channel through which information is transmitted between pails (for example, the processor 202, the memory 204, and the communications interface 206).

In an embodiment, when the computer device shown in FIG. 2 is a client, the processor 202 may invoke the program code stored in the memory 204 to perform the following operations generating a data digest for a data set stored in the memory 204, and controlling the communications interface 206 to send the data digest to the server, where the data digest is used to trigger the server to determine, according to the data digest, feedback information for the client, controlling the communications interface 206 to receive the feedback information sent by the server, when the feedback information includes a target data selection policy and a target policy parameter, determining a data subset from the data set according to the target data selection policy and the target policy parameter, where the target policy parameter is used to limit a quantity of pieces of data in the data subset and controlling the communications interface 206 to send the data subset to the server.

During implementation of this embodiment, before selecting data and sending the data to the server, the client generates a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption in a data processing process can be effectively reduced. In addition, representative data can be accurately and conveniently selected, so as to obtain a more accurate prediction model.

In an embodiment, when the computer device shown in FIG. 2 is a server, the processor 202 may invoke the program code stored in the memory 204 to perform the following operations controlling the communications interface 206 to receive data digests sent by one or more clients, determining, from the one or more clients according to the data digests, a target client that is allowed to upload data, determining a target data selection policy according to a data digest corresponding to the target client, and determining a target policy parameter according to the data digest corresponding to the target client and the target data selection policy, controlling the communications interface 206 to send the target data selection policy and the target policy parameter to the target client, so that the target client determines a to-be-transmitted data subset according to the target data selection policy and the target policy parameter, where the target policy parameter is used to limit a quantity of pieces of data in the data subset and controlling the communications interface 206 to receive the data subset sent by the target client, and establishing a prediction model or updating an existing prediction model according to the data subset.

During implementation of this embodiment, before receiving data sent by the client, the server first receives a data digest generated by the client and determines, according to the data digest, whether to allow the client to upload data, and determines a data selection policy and a policy parameter for the client. In this way, the client selects data according to the data selection policy and determines, according to the policy parameter, a quantity of pieces of data that need to be selected. Therefore, an amount of data transmitted by the client to the server can be controlled, and resource consumption of the server in a data processing process can be effectively reduced. In addition, representative data can be accurately and conveniently selected, so as to obtain a more accurate prediction model.

Figure 3:
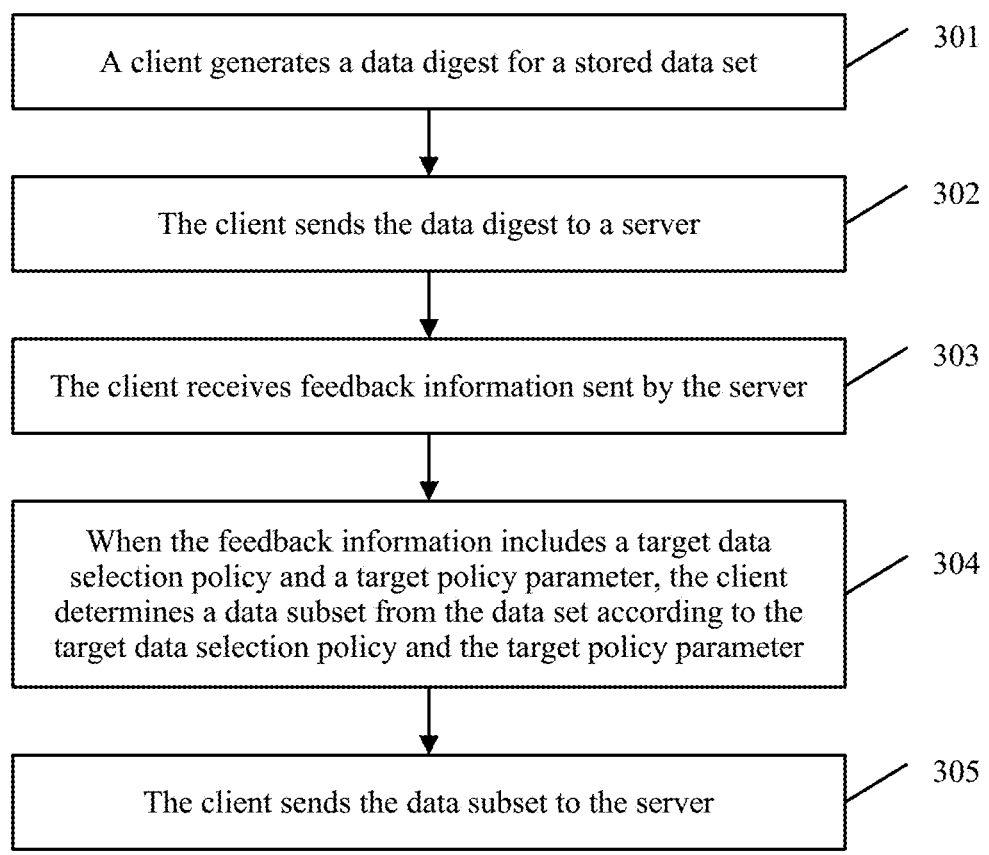
FIG. 3 is a schematic flowchart of a data processing method disclosed in an embodiment of the present invention.

Based on the network architecture shown in FIG. 1, an embodiment of the present invention discloses a data processing method. Referring to FIG. 3, FIG. 3 is a schematic flowchart of a data processing method disclosed in an embodiment of the present invention. As shown in FIG. 3, the data processing method may include the following steps.

301. A client generates a data digest for a stored data set.

302. The client sends the data digest to a server.

In this embodiment of the present invention, multiple pieces of data may be pre-stored in the client, and the data may form a data set. The client may generate a data digest for the data set. Specifically, the client may generate a data digest for some or all data in the data set. A possible implementation may include but is not limited to the following cases:

(1) The client generates a data digest for all data in the data set.

(2) The client generates a data digest for remaining data in the data set except data sent to the server.

(3) The client generates a data digest for all data that is in the data set and that is generated in a given time period, for example, data generated within latest 10 minutes.

(4) The client generates a data digest for specified pieces of data in the data set, for example, 1000 pieces of latest generated data.

(5) The client generates a data digest for data that is in the data set and that is generated by one or several specified behaviors, for example, data generated by latest three motions.

In this embodiment of the present invention, the data digest may refer to a statistics feature and description information of data, that is, a feature used to describe data. The data digest may include but is not limited to a statistical magnitude (for example, a quantity of pieces of data, a maximum value, a minimum value, an average value, and a variance), distribution of data (proportions of data in different ranges to all data), a proportion of labeled data (for example, there are six pieces of data, and three of them are labeled, so that a proportion of the labeled data is 50%), a proportion of abnormal data (for example, whether data is the abnormal data may be determined according to a range, and data outside the range is abnormal data), a maximum value, a minimum value, an average value, a standard deviation, and distribution of confidence levels, and the like.

In an optional implementation, when the data set includes multiple types of data, a specific implementation of step 301 in which the client generates the data digest for the stored data set may include the following steps:

(30) The client generates data digest subsets for each type of data, and combines the data digest subsets corresponding to each type of data into the data digest.

The following uses motion data as an example for description, and the motion data includes different types of data such as a speed, a heart rate, and an altitude, as shown in Table 1:

TABLE 1

| | Moment | | | | | |
|---|---|---|---|---|---|---|
| | 10:15:01 | 10:15:02 | 10:15:03 | 10:15:04 | 10:15:05 | 10:15:06 |
| Speed (kilometer/hour) | 5 | 7 | 9 | 10 | 6 | 20 |
| Heart rate (times/minute) | 80 | 95 | 110 | 140 | 130 | 90 |
| Altitude (meter) | 20 | 10 | 30 | 15 | 22 | 18 |
| Labeling | Unlabeled | Unlabeled | Running | Running | Walking | Unlabeled |

A data digest subset corresponding to each type of data (a speed, a heart rate, and an altitude) may be separately calculated. The following uses a speed as an example to describe how to calculate a data digest set, and a calculation method for another type of data is the same as that described below.

A data digest of the speed is as follows:

Statistical magnitude: a quantity of pieces of data=6, a minimum value=5, a maximum value=20, an average value=9.5, a standard deviation=5.468, and the like.

Distribution of data: Distribution of data is proportions of data in different ranges to all data. For example, data is divided into four ranges: [0, 6), [6, 8), [8, 10), and [10, ∞). Quantities of pieces of data in the ranges are respectively 1, 2, 1, 2, so that corresponding data proportions are 0.17, 0.33, 0.17, and 0.33, that is, distribution of the data.

Proportion of labeled data: In Table 1, there are three pieces of labeled data and three pieces of unlabeled data, so that a proportion of labeled data is 50%.

Proportion of abnormal data: Abnormal data may be detected in multiple methods, and may usually be determined by using a range (average value−3*standard deviation, average value+3*standard deviation). Data outside the range is abnormal data. In this example, the range is (−6.904, 25.904), and no data falls into this range. Therefore, a proportion of abnormal data is 0.

calculated. An average value of confidence levels in Table 2 is an average value of a confidence level sequence. There may be multiple methods for calculating the confidence level. For example, input of a prediction model is band motion data and output thereof is a probability value of a current user status (for example, walking, cycling, and swimming). A group of probability values is predicted by using each piece of data. If X1, X2, and X3 respectively represent values of a speed, a heart rate, and an altitude in one piece of data, formulas for calculating probabilities of each piece of data based on a prediction model are: for a probability of walking, P1=1/(1+exp(c11*X1+c21*X2+c31*X3)); for a probability of bicycling, P2=1/(1+exp(c12*X1+c22*X2+c32*X3)); for a probability of swimming, P3=1/(1+exp(c12*X1+c22*X2+c32*X3)). Parameters such as c11, c21, c31, c12, c22, c32, c13, c23, and c33 of the prediction model are known. When one piece of data (X1, X2, X3) is known, probability values of walking, cycling, and swimming of the user may be calculated after the piece of data is substituted into the foregoing formulas. It is assumed that P1=0.7, P2=0.1, and P3=0.2. Based on the foregoing probability values, a confidence level of a prediction result of the piece of data may be calculated by using a confidence level calculation formula. For example, the confidence level calculation formula is: confidence level=maximum probability−second maximum probability. Therefore, in the foregoing example, a confidence level of the piece of data is 0.7−0.2=0.5.

TABLE 2

| Average value of speeds | Variance of speeds | Proportion of heart rates (90 to 120 times/minute) | Maximum value of an altitude | Average value of a confidence level | Proportion of labeled data | ... |
|---|---|---|---|---|---|---|
| 9.5 | 5.468 | 0.5 | 30 | 0.2 | 0.5 | |

Data digests of a speed, a heart rate, and an altitude may be obtained by using the foregoing method, as shown in Table 2. Table 2 shows only a part of the data digests. Statistical magnitudes of confidence levels such as a maximum value, a minimum value, an average value, a variance, and distribution may be calculated in the following manner: The confidence levels may be calculated for each piece of data (which includes each type of data at a moment, for example, one piece of data that includes three pieces of data at a moment: a speed, a heart rate, and an altitude) based on a local prediction model of the client (that is, a prediction model fed back by the server to the client). Based on a confidence level sequence obtained by sorting the confidence levels of all pieces of data, statistical magnitudes such as a maximum value, a minimum value, an average value, a variance, and distribution of the confidence levels may be A data digest is a vector, and each element (such as a variance of speeds) of the vector is referred to as one data digest feature.

In this embodiment of the present invention, a communication connection may be established between the client and the server, and the client may be connected to the server by using a standard protocol (such as the HTTP protocol) or by using a dedicated protocol (for example, a sensor specific protocol), so as to enable the client to send the generated data digest to the server. The data digest is used to trigger the server to determine, according to the data digest, feedback information for the client. One server may simultaneously interact with multiple clients, so that the server may receive, in a same time period, data digests sent by the multiple clients. The server may perform statistical analysis on a data digest sent by each client, so as to determine clients that are allowed to upload data and clients that are not allowed to upload data, and notify the clients of this by using feedback information.

In this embodiment of the present invention, a condition for triggering the client to generate and send a data digest may include but is not limited to one or more of the following cases:

1. Timing: For example, the client calculates a data digest for one time and sends the data digest to the server at a specific interval (such as 5 minutes).

2. Triggering using a quantity of pieces of data: For example, after a quantity of pieces of data of the client accumulates to a specific value (such as 1000), the client calculates a data digest and sends the data digest to the server.

3. Storage triggering: For example, after data storage space (such as a magnetic disk or a memory) of the client reaches a set upper threshold, the client calculates a data digest and sends the data digest to the server.

4. Event triggering: For example, after some events are generated (for example, a user of a band completes a motion), the client calculates a data digest and sends the data digest to the server.

5. Server triggering: The server actively sends a request to the client, requesting the client to calculate a data digest and send the data digest to the server.

In an optional implementation, after step 301 is performed and before step 302 is performed, the method described in FIG. 3 may further include the following steps:

(31a) The client calculates similarity between the data digest and at least one historical data digest.

(31b) The client determines whether similarity exceeding a preset threshold exists in the calculated similarity, and if similarity exceeding a preset threshold exists in the calculated similarity, the client does not send the data digest to the server, or if no similarity exceeding a preset threshold exists in the calculated similarity, step 302 is triggered and the client sends the data digest to the server.

In this implementation, after generating the data digest, the client may perform similarity calculation on the data digest and one or more historical data digests, and separately calculate similarity between the data digest and each of these historical data digests. The client may locally store one or more data digests that are prior to the data digest, that is, the historical data digests. Because a data digest is a vector, similarity between two data digests may be calculated by using a vector cosine similarity formula.

In this implementation, the client may compare a calculated similarity with a preset threshold. When there is similarity greater than the preset threshold, it may indicate that similarity between a newly generated data digest and a historical data digest is high. In this case, the data digest does not need to be sent to the server. Therefore, sending similar data digests to the server for multiple times can be avoided. When each calculated similarity is less than the preset threshold, it may indicate that similarity between a newly generated data digest and a historical data digest is not high, that is, there is a relatively major difference. In this case, step 302 may further be performed to send the newly generated data digest to the server, so as to update a prediction model in the server.

303. The client receives feedback information sent by the server.

304. When the feedback information includes a target data selection policy and a target policy parameter, the client determines a data subset from the data set according to the target data selection policy and the target policy parameter.

In this embodiment of the present invention, when the feedback information received by the client includes the target data selection policy and the target policy parameter, it may indicate that the server allows the client to transmit data to the server. In this case, the client may determine a to-be-transmitted data subset from the data set according to the target data selection policy and the target policy parameter. The client may select a data subset from all data in the data set, or may select a data subset from data that is in the data set and that is used for generating a data digest, and this is not limited in this embodiment of the present invention. The target data selection policy is used to indicate a manner in which the client selects data from a data set, and may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like. The target policy parameter is used to indicate a quantity of pieces of data selected by the client from the data set, that is, to limit a quantity of pieces of data in the data subset.

In an optional implementation, when the target data selection policy is the selection policy based on a confidence level, the target policy parameter is a confidence level threshold. A specific implementation of step 304 in which the client determines the data subset from the data set according to the target data selection policy and the target policy parameter may include the following steps:

(32a) The client calculates a confidence level of data in the data set according to a prediction model sent by the server.

(32b) The client extracts, from the data set, data whose confidence level is less than the confidence level threshold, and combines the data into the data subset.

In this implementation, a method based on a confidence level may be used for pieces of data that are with a relatively large variance but with commonly high confidence levels. The server may feedback, to the client, a prediction model obtained by means of training. The client may calculate a confidence level of each piece of data in the data set by using the prediction model, and extract, from the data set, the data whose confidence level is less than the confidence level threshold. For example, the confidence level threshold is 0.5, and all data whose confidence level is less than 0.5 may be selected from the data set. Selected data is relatively highly representative, and a quantity of pieces of the selected data is relatively small. Therefore, an amount of data transmitted by the client to the server can be reduced.

In an optional implementation, when the target data selection policy is the sampling selection policy, the target policy parameter is a sampling proportion. A specific implementation of step 304 in which the client determines the data subset from the data set according to the target data selection policy and the target policy parameter may include the following steps:

(33a) The client determines a sampling quantity of pieces of data in the data set according to the sampling proportion.

(33b) The client extracts the sampling quantity of pieces of data from the data set, and combines the data into the data subset.

In this implementation, a small variance of data indicates small fluctuation amplitude of the data. When a sampling method is used, a computation amount is small and relatively highly representative data can be selected. A quantity of pieces of selected data is determined by the sampling proportion. For example, when the sampling proportion is 0.1, it represents that 10 pieces of data are extracted from 100 pieces of data.

In this implementation, the sampling selection policy may include but is not limited to any one of a random sampling selection policy, an interval sampling selection policy, a stratified sampling selection policy, or the like. For example, 10 pieces of data need to be extracted from 100 pieces of data. Under the random sampling selection policy, 10 pieces of data may be randomly extracted from the 100 pieces of data to form a data subset. Under the interval sampling selection policy, one piece of data is extracted at an interval of several pieces of data, and the $1^{st}$, the $11^{th}$, the $21^{st}$, the $31^{st}$, the $41^{st}$, the $51^{st}$, the $61^{st}$, the $71^{st}$, the $81^{st}$, the $91^{st}$ pieces of data in the data may be extracted and combined into a data subset. Under the stratified sampling selection policy, the 100 pieces of data are classified into different layers according to a feature or a rule, and then representative data is extracted from the different layers independently, randomly, or at an interval.

In an optional implementation, when the target data selection policy is the clustering-based selection policy, the target policy parameter is a quantity of clustered groups. A specific implementation of step 304 in which the client determines the data subset from the data set according to the target data selection policy and the target policy parameter may include the following steps:

(34a) The client determines a to-be-uploaded quantity of pieces of data in the data set according to the quantity of the clustered groups.

(34b) The client selects the to-be-uploaded quantity of pieces of data from the data set, and combines the data into the data subset.

In this implementation, a clustering-based method may be used for pieces of data that are with a relatively large variance and with commonly low confidence levels. For example, the quantity of the clustered groups is 10, and the data in the data set is classified into 10 groups. One piece of representative data is selected from each group, and finally, 10 pieces of representative data are obtained and form a data subset. The 10 pieces of representative data may be randomly selected or may be selected based on a specific rule, and this is not limited in this implementation.

It should be noted that the foregoing three data selection policies may be separately used or be combined for use, and this is not limited in this embodiment of the present invention.

305. The client sends the data subset to the server.

In this embodiment of the present invention, after the client sends the data subset to the server, the server may establish a new prediction model by using the data subset, or update an existing prediction model by using the data subset, so as to obtain a more accurate prediction model. After sending the data subset to the server, the client may clear the sent data according to a requirement or in consideration of storage space.

In an optional implementation, the method described in FIG. 3 may further include the following steps.

(35) When the feedback information includes information that is used to instruct the client to forbid data upload, the client responds to the feedback information and forbids sending data to the server.

In this implementation, when the feedback information includes the information that is used to instruct the client to forbid data upload, it may indicate that the server does not allow the client to transmit data to the server. In this case, the client does not send data to the server during a current operation. Carrying out this implementation can reduce unnecessary data transmission and can effectively reduce load pressure of the server.

In this embodiment of the present invention, when new data is generated before the client sends the data subset to the server, the data subset may be updated, and then the updated data subset is sent to the server, so that the server obtains more representative data.

In an optional implementation, when the client generates new data based on a clustering-based data selection policy, the method described in FIG. 3 may further include the following steps.

(36) The client obtains, from the data subset, all target data of which a generation time has an interval that is less than a preset time interval and that is from a generation time of the new data.

(37) The client calculates similarity between all target data and the new data to obtain maximum similarity and target data corresponding to the maximum similarity.

(38) The client determines whether the maximum similarity is greater than a preset threshold.

(39) When the maximum similarity is greater than the preset threshold, the client replaces the target data corresponding to the maximum similarity with the new data, so as to obtain a first updated data subset.

Correspondingly, a specific implementation of step 305 in which the client sends the data subset to the server may be as follows:

The client sends the first updated data subset to the server.

In another optional implementation, the method described in FIG. 3 may further include the following step:

(40) When the maximum similarity is not greater than the preset threshold, the client adds the new data into the data subset to obtain a second updated data subset.

Correspondingly, a specific implementation of step 305 in which the client sends the data subset to the server may be as follows:

The client sends the second updated data subset to the server.

In this implementation, for new data generated in the client, all data of which a generation time has an interval that is within a preset time interval and that is from a generation time of the new data may be selected from a previously determined data subset. It is considered herein that data of the client has time validity. Two pieces of similar data appearing in different time periods may have different meanings. Therefore, the two pieces of similar data cannot replace each other. Two pieces of similar data appearing in relatively close time periods may replace each other.

In this implementation, when there is no data whose generation time has an interval that is less than the pre-set time interval and that is from a generation time of the new data, that is, when a target data set is empty, it may be considered that the new data is generated long before or after each piece of representative data in the data subset. In this case, the new data may be used as one piece of new representative data and be added into the data subset. If a target data set is not empty, similarity between the new data and each piece of target data may be calculated to find a piece of target data that has maximum similarity. A method for calculating similarity between two pieces of data is related to a specific data source. For example, each piece of motion data of a band is multidimensional and may be considered as one vector. Therefore, similarity between two pieces of motion data may be calculated by using cosine similarity. Similarity between video surveillance data of a camera is similarity between picture frames collected by the camera. When the maximum similarity is greater than the preset threshold, it indicates that the new data replaces target data that is in the data subset and that is corresponding to the maximum similarity, so as to obtain the first data subset; and when the maximum similarity is not greater than the preset threshold, the new data cannot replace the target data that is in the data set and that is corresponding to the maximum similarity, and the new data is directly added into the data subset to obtain the second data subset.

For example, the data subset includes data 1 with a generation time 10:34:00, data 2 with a generation time 10:35:06, data 3 with a generation time 10:35:56, and data 4 with a generation time 10:36:15. There is newly generated data A with a generation time 10:36:45 in the client, and the preset time interval is two minutes, so that all obtained target data is the data 2, the data 3, and the data 4. Similarity that is between the data A and each of the data 2, the data 3, and the data 4 is separately calculated and is 0.12, 0.75, and 0.50 respectively. Therefore, maximum similarity is 0.75 and is corresponding to the data 3. When 0.75 is greater than a given preset threshold, the data A replaces the data 3, and when 0.75 is less than the preset threshold, the data A cannot replace the data 3, and the data A is directly added into the data subset.

In the method described in FIG. 3, the client generates the data digest for the stored data set and sends the data digest to the server, and the server determines the feedback information for the client according to the data digest and sends the feedback information to the client. When the feedback information received by the client includes the target data selection policy and the target policy parameter, the client may determine the data subset from the data set according to the target data selection policy and the target policy parameter and send the data subset to the server. The server may establish the prediction model or update the existing prediction model according to the data subset. By implementing the method described in FIG. 3, before selecting data and sending the data to the server, the client generates a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption in a data processing process can be effectively reduced. In addition, representative data can be accurately and conveniently selected, so as to obtain a more accurate prediction model.

Figure 4:
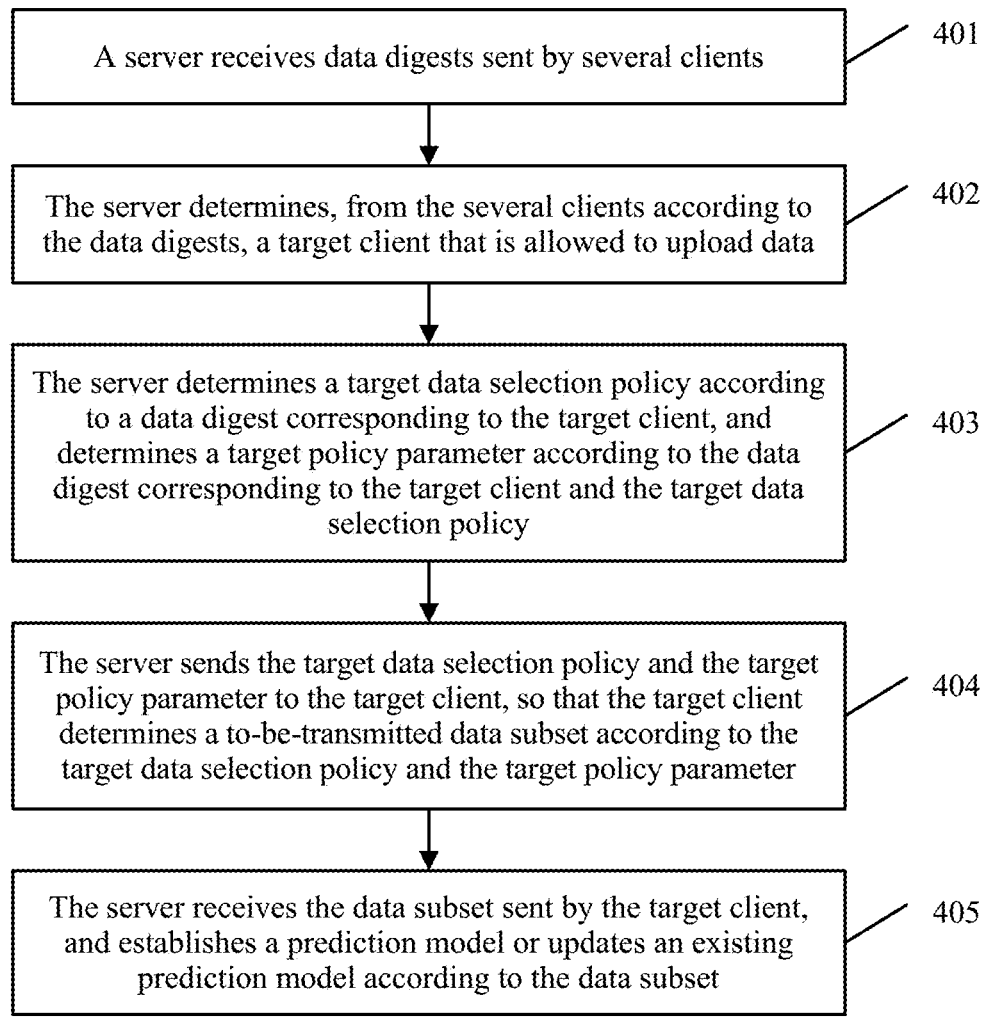
FIG. 4 is a schematic flowchart of another data processing method disclosed in an embodiment of the present invention.

Based on the network architecture shown in FIG. 1, an embodiment of the present invention discloses another data processing method. Referring to FIG. 4, FIG. 4 is a schematic flowchart of another data processing method disclosed in an embodiment of the present invention. As shown in FIG. 4, the data processing method may include the following steps.

401. A server receives data digests sent by one or more clients.

In this embodiment of the present invention, one server may be simultaneously connected to one or more clients, so that the server may separately receive, in a same time period, data digests sent by multiple clients.

In this embodiment of the present invention, the server responds to a request of the client in at least two manners:

(1) Synchronous response: After the client sends a request, the server immediately responds to the request.

Herein, after the client sends a data digest to the server, the server immediately performs analysis processing on the data digest.

(2) Asynchronous response: After receiving a data digest of the client, the server first caches the data digest into the server, and performs analysis processing on the data digest only after a trigger condition is met.

The trigger condition for the asynchronous response includes but is not limited to the following cases:

1. The server regularly triggers, at an interval (such as one minute), the analysis processing performed on the data digest.

2. After a quantity of the clients that send the data digest exceeds a specific quantity (such as 100), the server starts to perform the analysis processing on the data digest.

3. The server starts to give a response after an amount of accumulated data in the data digests of the clients exceeds a specific amount. A data digest of each client includes information about a quantity of pieces of data. The server summarizes and calculates a sum of quantities of pieces of data of the multiple clients, and starts to perform the analysis processing on the data digests after the sum of the quantities of pieces of data exceeds a specific amount (such as one million pieces of data).

402. The server determines, from the one or more clients according to the data digests, a target client that is allowed to upload data.

In this embodiment of the present invention, a server may be connected to multiple clients, and when all of the multiple clients send data to the server, load pressure of the server is excessively high. Therefore, some clients in the multiple clients may be selected with a purpose and be allowed to upload data, and some clients are forbidden to upload data. There may be one or more target clients that are allowed to upload data.

In an optional implementation, a specific implementation of step 402 in which the server determines, from the one or more clients according to the data digests, the target client that is allowed to upload data may include the following steps:

(41) The server classifies the one or more clients into multiple groups according to the data digests sent by the one or more clients.

(42) The server selects at least one client from each of the multiple groups, and uses the at least one client selected from each group as the target client that is allowed to upload data.

In this implementation, clients with similar data digests are clustered into one group by using a clustering method. Output of the clustering is multiple groups, and each group includes multiple clients. After the clustering, at least one client is selected from each group. The at least one client does not include all clients, so that the selected client needs to transmit data to the server, and a client that is in the group and that is not selected does not need to transmit data. Carrying out this implementation can significantly reduce a concurrent amount of data transmitted by the client to the server.

The following describes this process by using an example. For example, there are M clients, and corresponding data digests are shown in Table 3 below.

TABLE 3

| Client ID | Average value of speeds | Proportion of speed abnormal data | Variance of speeds | Proportion of heart rates (90 to 120) | Maximum value of an altitude | ... | Proportion of labeled data |
|---|---|---|---|---|---|---|---|
| 1 | 6.7 | 0.3 | 2 | 0.6 | 0 | ... | 0.9 |
| 2 | 4.8 | 0.5 | 6 | 0.3 | 1 | ... | 0.9 |
| ... | ... | ... | ... | ... | ... | ... | ... |
| M | 5.5 | 0 | 8 | 0.2 | 7 | ... | 0.5 |

Clustering processing may be performed on the M clients in the foregoing table by using a k-means clustering method. When three clustering centers are selected, it is assumed that an obtained clustering result is shown in Table 4.

TABLE 4

| Client ID | Group ID |
|---|---|
| 1 | 2 |
| 2 | 1 |
| 3 | 1 |
| 4 | 3 |
| ... | ... |
| M | 2 |

One or more representative clients are selected from each group. For example, a client that is closest to a clustering center of the group may be selected by using a random selection method or a rule-based method. With reference to the foregoing example, a result shown in Table 5 is output.

TABLE 5

| Group ID | Representative client ID |
|---|---|
| 1 | 2 |
| 2 | 100 |
| 3 | 4 |

For a group 1, a representative client that needs to send data to the server is a client 2 in the group 1, and another client in the group 1 does not need to send data to the server. For a group 2, a representative client that needs to send data to the server is a client 100 in the group 2, and another client in the group 2 does not need to send data to the server. For a group 3, a representative client that needs to send data to the server is a client 4 in the group 3, and another client in the group 3 does not need to send data to the server.

403. The server determines a target data selection policy according to a data digest corresponding to the target client, and determines a target policy parameter according to the data digest corresponding to the target client and the target data selection policy.

In this embodiment of the present invention, the target data selection policy may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like.

In this embodiment of the present invention, the server may determine the target data selection policy according to feature information in the data digest corresponding to the target client. For example, the target data selection policy may be determined based on an empirical rule. When a variance of data in the data digests is relatively small, the sampling selection policy may be selected and used as the target data selection policy of the target client. When a variance of data in the data digests is relatively large and confidence levels are commonly high, the selection policy based on a confidence level may be used as the target data selection policy of the target client. When a variance of data in the data digests is relatively large but confidence levels are commonly low, the clustering-based selection policy may be used as the target data selection policy of the target client.

In an optional implementation, a specific implementation of step 403 in which the server determines the target policy parameter according to the data digest corresponding to the target client and the target data selection policy may include the following steps:

(43) The server generates a data digest corresponding to the server for a stored data set.

(44) The server calculates similarity between the data digest corresponding to the server and the data digest corresponding to the target client.

(45) The server converts the similarity into the target policy parameter according to a conversion function corresponding to the target data selection policy.

In this implementation, a data set in the server is generated by combining data currently stored in the server. A method for generating the data digest corresponding to the server is the same as a method used by the client to generate a data digest. A data amount of the server is large. However, calculation of a data digest is usually incremental calculation, so that a performance is not affected, that is, on the basis of a latest calculated data digest, only newly added data instead of all data needs to be used to update the latest calculated data digest. For example, when an average value is calculated, a new average value may be calculated by using only a previous average value and the newly added data instead of calculating a sum of all data and then calculating an average value. Similarity between the data digest corresponding to the server and a data digest corresponding to each target client may be calculated by using multiple similarity calculation methods, and a common method is a cosine similarity method, a Pearson similarity method, or the like.

In this implementation, after the similarity between the data digest corresponding to the server and the data digest corresponding to each target client is calculated, a target policy parameter of each target client is determined based on a conversion function (a historical experience-based conversion function) corresponding to a target data selection policy of each target client. For example, for a sampling proportion parameter of random sampling, similarity is 0.3, and a conversion function is: sampling proportion=similarity/2. Correspondingly, the sampling proportion is 0.3/2=0.15. Therefore, the target policy parameter is determined.

In an optional implementation, the server may also determine the target data selection policy and the target policy parameter of the target client based on data mining modeling. A specific implementation of step 403 in which the server determines the target data selection policy according to the data digest corresponding to the target client may include the following steps.

(46) The server calculates model variation amplitudes under different data selection policies by using the data digest corresponding to the target client, and according to a pre-established correspondence among a model variation amplitude, a historical data digest, and a data selection policy.

(47) The server obtains a data selection policy corresponding to a maximum model variation amplitude in the calculated model variation amplitudes under the different data selection policies, and using the data selection policy as the target data selection policy.

model variation amplitudes corresponding to a data digest of new data under different data selection policies, and use a data selection policy corresponding to a maximum model variation amplitude as the target data selection policy of the target client. The server may train the correspondence between the three each time when a data digest of new data is received, or train the correspondence between the three at an interval of a specific time, or may train the correspondence between the three each time when a quantity of data digests of received new data reaches a specified value. This is not limited in this implementation.

The following describes this process by using an example. In the training process, a training data set is first established based on historical data. The training data set includes four types of fields: a data digest, a data selection policy, a policy parameter, and a model variation amplitude. As shown in the following Table 6 (data in Table 6 is randomly given):

TABLE 6

| Average value of speeds | Variance of speeds | Proportion of heart rates (90 to 120) | Maximum value of an altitude | Variance of heart rates | Data selection policy ID | Policy parameter | Model variation amplitude |
|---|---|---|---|---|---|---|---|
| 5 | 4.7 | ... | 12 | 10.5 | Random | 0.1 | 0.3 |
| 3 | 1.9 | ... | 90 | 12 | Confidence level-based | 0.5 | 1.2 |
| ... | ... | ... | ... | ... | Clustering-based | 0.3 | 3.5 |
| 10 | 7.4 | ... | 52 | 33 | Confidence level-based | 0.2 | 0.8 |

Correspondingly, a specific implementation of step 403 in which the server determines the target policy parameter according to the data digest corresponding to the target client and the target data selection policy may include the following step:

(48) The server determines the target policy parameter by using the maximum model variation amplitude and according to a correspondence between a model variation amplitude and a policy parameter under the target data selection policy.

In this implementation, a training data set is established, and the training data set includes model variation amplitudes obtained when different data digests use different data selection policies and policy parameters in historical data (such as a historical data digest uploaded by the client, and data selection policies and policy parameters obtained by the server according to different historical data digests). Based on this training data set, on the premise that load of the server (a quantity of pieces of data that can be processed by the server at a moment) is lower than an upper threshold, it is predicted that a data digest of new data may bring a data selection policy with a maximum model variation amplitude. The model variation amplitude herein is a variation amplitude of a prediction model, that is, a variation degree that is of a prediction model and that is generated in different data digests. The prediction model may be a logistic regression model, a support vector machine model, a decision tree model, or the like.

This implementation may be divided into a training process and a prediction process. Training is intended to establish a correspondence between a model variation amplitude, a historical data digest (that is, a data digest uploaded by the client for the latest one or more times), and a data selection policy. Prediction is intended to predict, based on the correspondence obtained by means of training, A method for calculating a model variation amplitude is: model variation amplitude=100*(1−similarity between a new model parameter vector and an old model parameter vector). For example, for a support vector machine algorithm, a model parameter vector is an equation of a straight line of a support vector. For example, a parameter vector of 3*x+2*y is (3, 2). The similarity between the new model parameter vector and the old model parameter vector may be calculated by using cosine similarity. It is assumed that a parameter vector of an old model is (1.5, 2.4), and a parameter vector of a new model is (1.7, 2.0). Therefore, cosine similarity between the new model and the old model is (1.5*1.7+2.4*2.0)/sqrt((1.5*1.5+2.4*2.4)*(1.7*1.7+2.0*2.0))=0.9894, and a model variation amplitude is 100*(1−0.9894)=1.06.

After the training data set is established, a relationship among a model variation amplitude, a data digest, and a data selection policy may be learned by using a regression model (for example, a linear regression model, a polynomial regression model, and an exponential regression model, and the regression model is a prior art and a principle of the regression model is not described in detail.) in data mining. For example:

For the sampling selection policy: model variation amplitude=average value of speeds+proportion of heart rates (90 to 120).

For the selection policy based on a confidence level: model variation amplitude=0.5*variance of speeds+maximum value of an altitude.

For the clustering-based selection policy: model variation amplitude=3*average value of speeds−0.3*variance of heart rates.

In the prediction process, estimated model variation amplitudes are predicted based on a data digest of new data under different data selection policies. For example, the data digest of the new data is shown in Table 7.

TABLE 7

| Average value of speeds | Variance of speeds | Proportion of heart rates (90 to 120) | Maximum value of an altitude | Variance of heart rates |
|---|---|---|---|---|
| 4 | 3 | 0.3 | 6 | 2 |

Estimated model variation amplitudes under the several selection policies are respectively: for the sampling selection policy, model variation amplitude=4+0.3+4.3; for the selection policy based on a confidence level, model variation amplitude=0.5*3+6=7.4; and for the clustering-based selection policy, model variation amplitude=3*4−0.3*2=11.4. The model variation amplitude under the clustering-based selection policy is the largest, and therefore a clustering-based data selection policy is selected. It may indicate that a prediction model changes relatively greatly when representative data is selected by using a clustering method, and the representative data plays an important role in updating the prediction model. Impact on the prediction model is relatively slight when representative data is selected by using a sampling method and a method based on a confidence level. Therefore, a data selection policy that has greatest impact on the prediction model may be first selected.

For a clustering-based data selection policy, it is assumed that a relationship between a model variation amplitude Y and a policy parameter X (a quantity of pieces of transmitted data) is: If X>300, Y=0.5; and if X≤300, Y=X/2. If load of the server is 40000 and there are 100 clients, maximum load allocated to each client is 400 (a quantity of pieces of transmitted data). Because a model variation amplitude does not increase after X=300, an optimal policy parameter is 300. Correspondences between the model variation amplitude and the policy parameter under different data selection policies may be obtained by analyzing data in the training data set.

404. The server sends the target data selection policy and the target policy parameter to the target client, so that the target client determines a to-be-transmitted data subset according to the target data selection policy and the target policy parameter.

In this embodiment of the present invention, the target policy parameter is used to limit a quantity of pieces of data in the data subset.

405. The server receives the data subset sent by the target client, and establishes a prediction model or updates an existing prediction model according to the data subset.

In this embodiment of the present invention, the method described in FIG. 4 may further include the following step:

(49) The server sends feedback information to a remaining client in the one or more clients except the target client. The feedback information is used to instruct the remaining client in the one or more clients except the target client to forbid sending data to the server. The client that receives the feedback information may discard corresponding data.

By implementing the method described in FIG. 4, before receiving data sent by the client, the server first receives a data digest generated by the client and determines, according to the data digest, whether to allow the client to upload data, and determines a data selection policy and a policy parameter for the client. In this way, the client selects data according to the data selection policy and determines, according to the policy parameter, a quantity of pieces of data that need to be selected. Therefore, an amount of data transmitted by the client to the server can be controlled, and resource consumption of the server in a data processing process can be effectively reduced. In addition, representative data can be accurately and conveniently selected, so as to obtain a more accurate prediction model.

Figure 5:
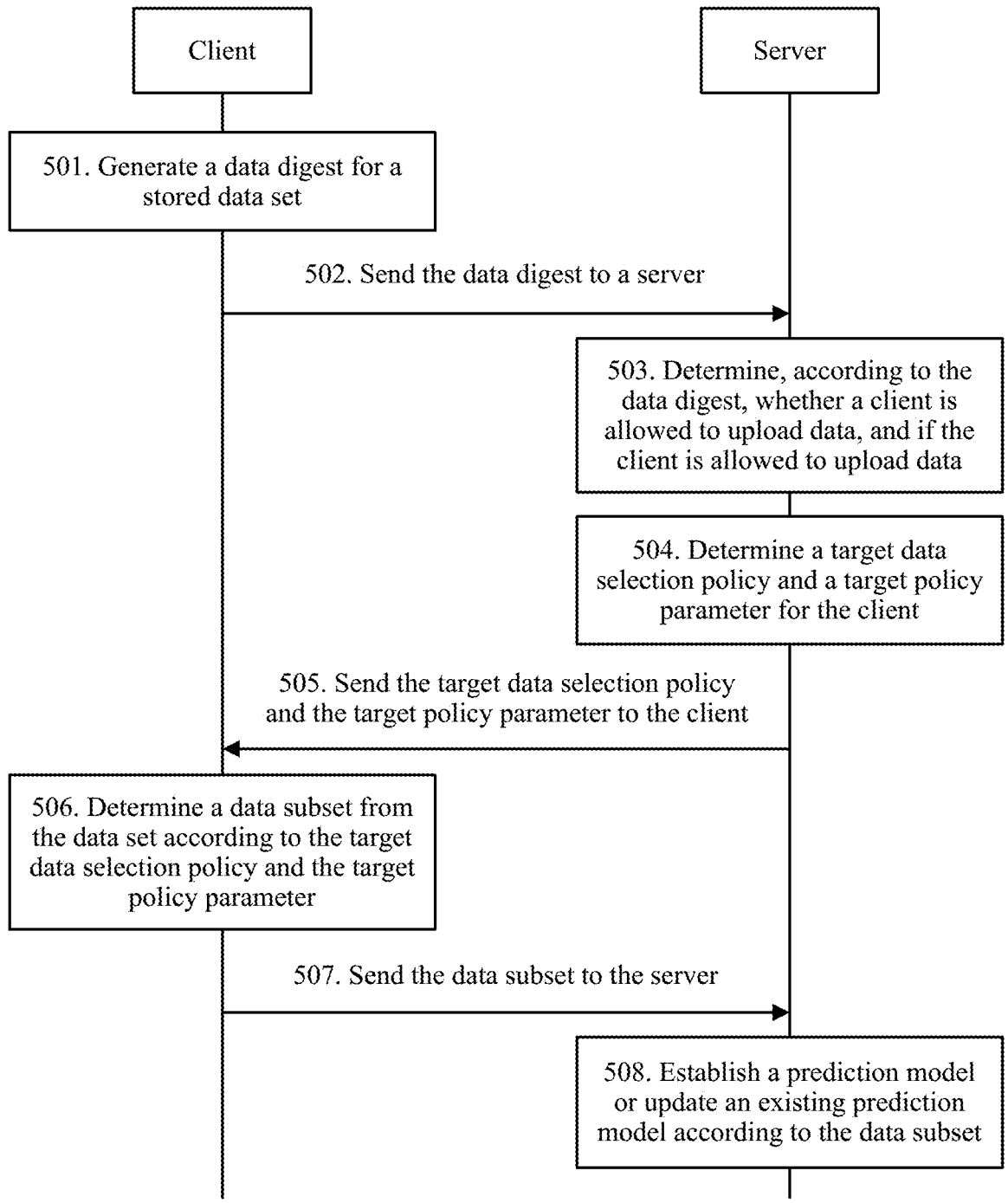
FIG. 5 is a schematic flowchart of still another data processing method disclosed in an embodiment of the present invention.

Based on the network architecture shown in FIG. 1, an embodiment of the present invention discloses another data processing method. Referring to FIG. 5. FIG. 5 is a schematic flowchart of still another data processing method disclosed in an embodiment of the present invention. FIG. 5 shows only a process of interaction between a client and a server. For a process of interaction between each client and the server, refer to FIG. 5. As shown in FIG. 5, the data processing method may include the following steps.

501. The client generates a data digest for a stored data set.

502. The client sends the data digest to the server.

503. The server determines, according to the data digest, whether the client is allowed to upload data, and performs step 504 if the client is allowed to upload data.

In this embodiment of the present invention, the server may determine, by using a clustering method, whether the client is allowed to upload data. Specifically, the server may calculate similarity between the data digest sent by the client and a data digest received by the server from another client in a same time period, and combine the client and a client whose data digest is similar to the data digest of the client into one group, and then select one or more clients from the group randomly or based on an empirical rule, and use the one or more clients as clients that are allowed to upload data to the server. A remaining client in the group is a client that is not allowed to upload data to the server. When the client is the selected client that is allowed to upload data to the server, the client may transmit data to the server. When the client is the client that is not allowed to upload data to the server, the server may send feedback information to the client and notify the client that data does not need to be uploaded and this operation ends.

504. The server determines a target data selection policy and a target policy parameter for the client.

In this embodiment of the present invention, when the client is allowed to upload data, the server may determine the target data selection policy and the target policy parameter of the client according to the data digest of the client or by using a method based on a historical empirical rule, or by using a method based on data mining modeling. This is not limited in this embodiment of the present invention.

In this embodiment of the present invention, the target data selection policy may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like. The target policy parameter is used to limit a quantity of pieces of data selected when the client performs data selection.

505. The server sends the target data selection policy and the target policy parameter to the client.

506. The client determines a data subset from the data set according to the target data selection policy and the target policy parameter.

507. The client sends the data subset to the server.

508. The server establishes a prediction model or updates an existing prediction model according to the data subset.

Figure 6:
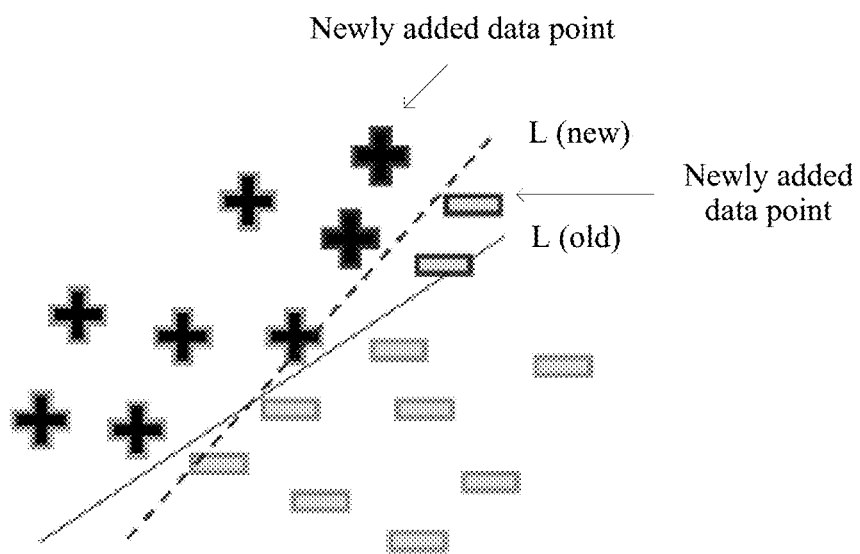
FIG. 6 is a schematic diagram of a prediction model update disclosed in an embodiment of the present invention.

For example, after receiving the data subset sent by the client, the server may update an existing prediction model in the server. As shown in FIG. 6, FIG. 6 shows a schematic diagram of a prediction model update. The prediction model herein is a classification model in which data is classified into two categories. A plus sign represents data points of one category, and a minus sign represents data points of the other category. A support vector L may be learned by using a support vector machine method, so as to distinguish between data of the two categories. L (old) (indicated by a solid line) is a classification vector of an old model. When new data is generated in the client and a new data subset is uploaded, two data points are newly added into each of the two categories. The new data subset may be used to update the old model, so that the classification vector of the model is updated from L (old) to L (new) (indicated by a dashed line) to finely adjust the model to be more accurate.

In this embodiment of the present invention, by implementing the method described in FIG. 5, before the client selects data and sends the data to the server, the client generates a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption of the server in a data processing process can be effectively reduced. In addition, representative data can be accurately and conveniently selected, so as to obtain a more accurate prediction model.

Figure 7:
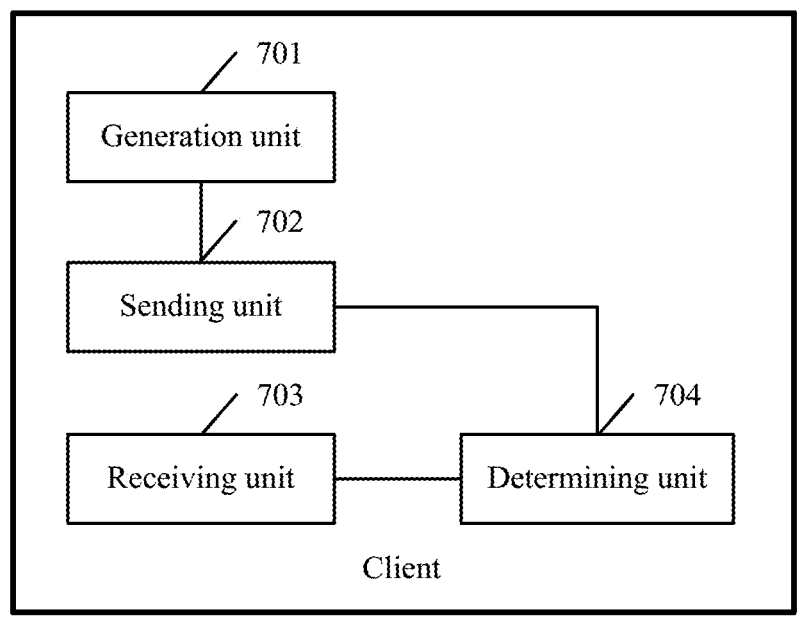
FIG. 7 is a schematic structural diagram of a client disclosed in an embodiment of the present invention.

Based on the network architecture shown in FIG. 1, an embodiment of the present invention discloses another client. Referring to FIG. 7, FIG. 7 is a schematic structural diagram of a client disclosed in an embodiment of the present invention. The client may be configured to perform a data processing method disclosed in an embodiment of the present invention. As shown in FIG. 7, the client may include: a generation unit 701, a sending unit 702, a receiving unit 703, and a determining unit 704.

The generation unit 701 is configured to generate a data digest for a stored data set.

In this embodiment of the present invention, the data set is obtained by combining one or more pieces of data currently stored by the client. Specifically, the generation unit 701 may generate a data digest for all or a part of data in the data set.

In this embodiment of the present invention, the data digest is used to describe a data feature and may include but is not limited to a statistical magnitude, data distribution, a proportion of labeled data, a proportion of abnormal data, a maximum value, a minimum value, an average value, a standard variance, and distribution of a confidence level, and the like. The data digest is a vector, and each element of the vector may be referred to as one data digest feature.

In an optional implementation, when the data set includes multiple types of data, the generation unit 701 may be specifically configured to generate data digest subsets corresponding to each type of data, and combine the data digest subsets corresponding to each type of data into the data digest.

The sending unit 702 is configured to send the data digest to the server.

In this embodiment of the present invention, a communication connection may be established between the client and the server. The client and the server may be connected by using a standard protocol (such as the HTTP protocol), or may be connected by using a dedicated protocol (such as a sensor specific protocol), so that the sending unit 702 sends, to the server, the data digest generated by the generation unit 701. The data digest is used to trigger the server to determine, according to the data digest, feedback information for the client.

The receiving unit 703 is configured to receive feedback information sent by the server.

The determining unit 704 is configured to: when the feedback information includes a target data selection policy and a target policy parameter, determine a data subset from the data set according to the target data selection policy and the target policy parameter.

In this embodiment of the present invention, the target data selection policy is used to indicate a manner in which the client selects data from a data set, and may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like. The target policy parameter is used to indicate a quantity of pieces of data selected by the client from the data set, that is, to limit a quantity of pieces of data in the data subset.

The sending unit 702 is further configured to send the data subset to the server.

Figure 8:
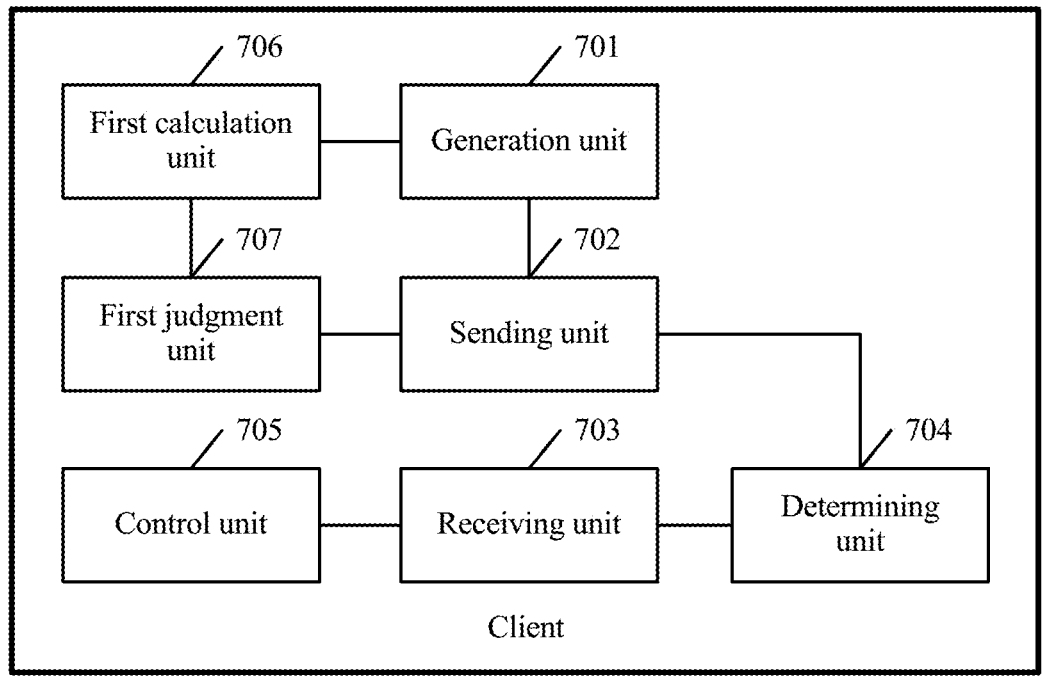
FIG. 8 is a schematic structural diagram of another client disclosed in an embodiment of the present invention.

Referring to FIG. 8, FIG. 8 is a schematic structural diagram of another client disclosed in an embodiment of the present invention. The client may be configured to perform a data processing method disclosed in an embodiment of the present invention. The client shown in FIG. 8 is obtained by further optimizing the client shown in FIG. 7. In comparison with the client shown in FIG. 7, the client shown in FIG. 8 may further include a control unit 705, configured to: when the feedback information includes information that is used to instruct the client to forbid data upload, respond to the feedback information and forbid sending data to the server.

In an optional implementation, the client shown in FIG. 8 may further include a first calculation unit 706, configured to calculate similarity between the data digest and at least one historical data digest after the generation unit 701 generates the data digest and a first judgment unit 707, configured to: determine whether similarity exceeding a preset threshold exists in the calculated similarity, and when no similarity exceeding the preset threshold exists in the calculated similarity, trigger the sending unit 702 to perform an operation of sending the data digest to the server.

Figure 9:
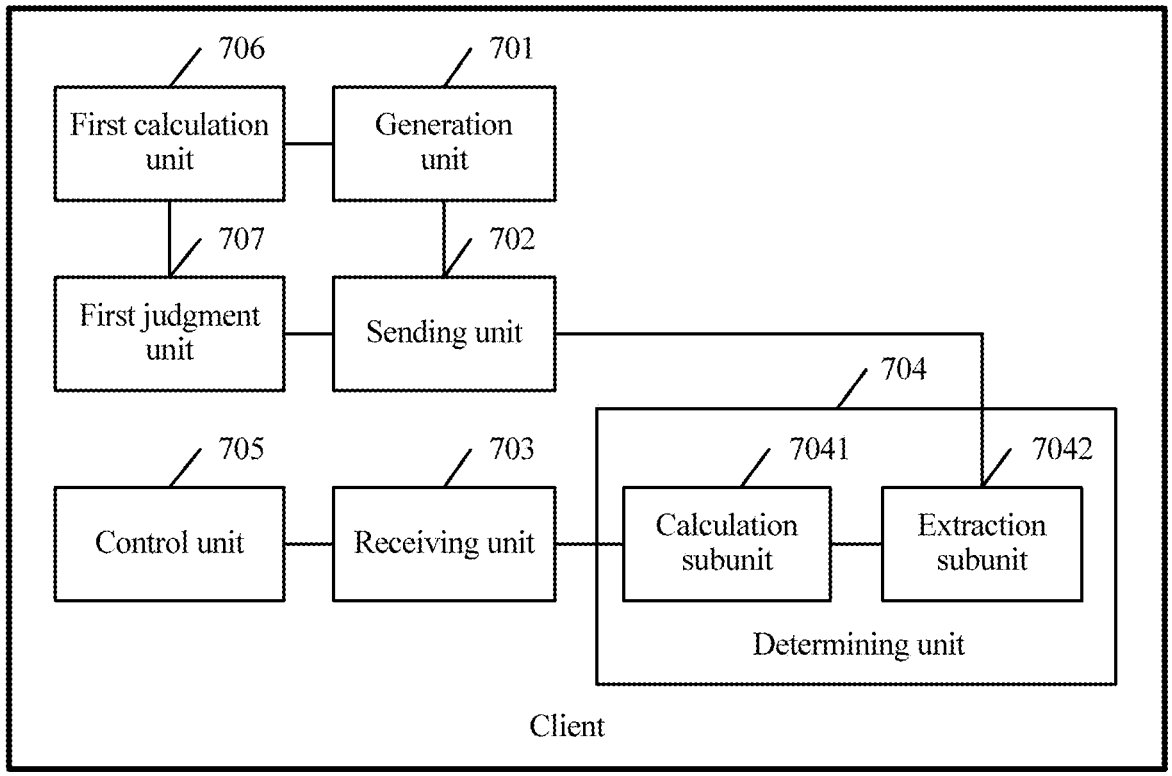
FIG. 9 is a schematic structural diagram of still another client disclosed in an embodiment of the present invention.

In an optional implementation, when the target data selection policy is the selection policy based on a confidence level, the target policy parameter is a confidence level threshold. Referring to FIG. 9, FIG. 9 is a schematic structural diagram of still another client disclosed in an embodiment of the present invention. The client may be configured to perform a data processing method disclosed in an embodiment of the present invention. The client shown in FIG. 9 is obtained by further optimizing the client shown in FIG. 8. In comparison with the client shown in FIG. 8, a determining unit 704 in the client shown in FIG. 9 may include a calculation subunit 7041, configured to calculate a confidence level of data in the data set according to a prediction model sent by the server and an extraction subunit 7042, configured to: extract, from the data set, data whose confidence level is less than the confidence level threshold, and combine the data into the data subset.

Figure 10:
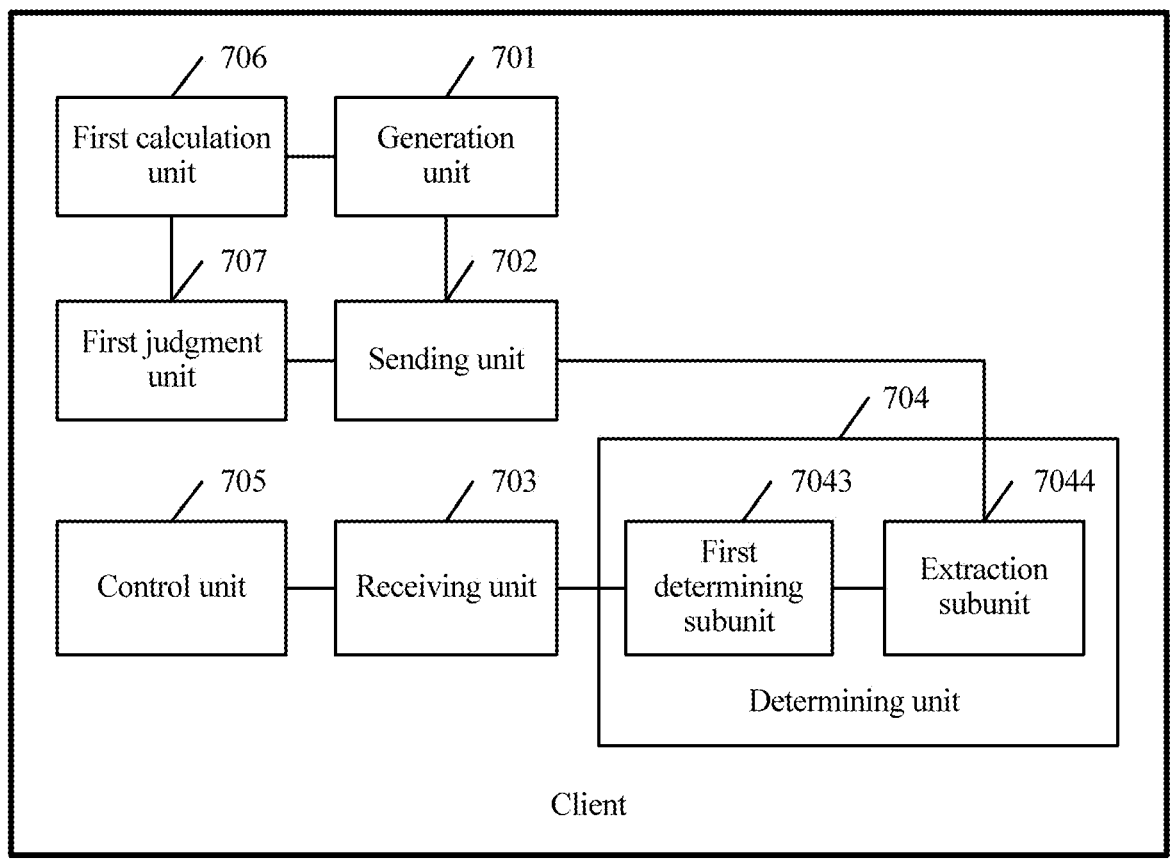
FIG. 10 is a schematic structural diagram of still another client disclosed in an embodiment of the present invention.

In an optional implementation, when the target data selection policy is the sampling selection policy, the target policy parameter is a sampling proportion. Referring to FIG. 10, FIG. 10 is a schematic structural diagram of still another client disclosed in an embodiment of the present invention.

The client may be configured to perform a data processing method disclosed in an embodiment of the present invention. The client shown in FIG. 10 is obtained by further optimizing the client shown in FIG. 8. In comparison with the client shown in FIG. 8, a determining unit 704 in the client shown in FIG. 10 may include a first determining subunit 7043, configured to determine a sampling quantity of pieces of data in the data set according to the sampling proportion and an extraction subunit 7044, configured to: extract the sampling quantity of pieces of data from the data set, and combine the data into the data subset.

Figure 11:
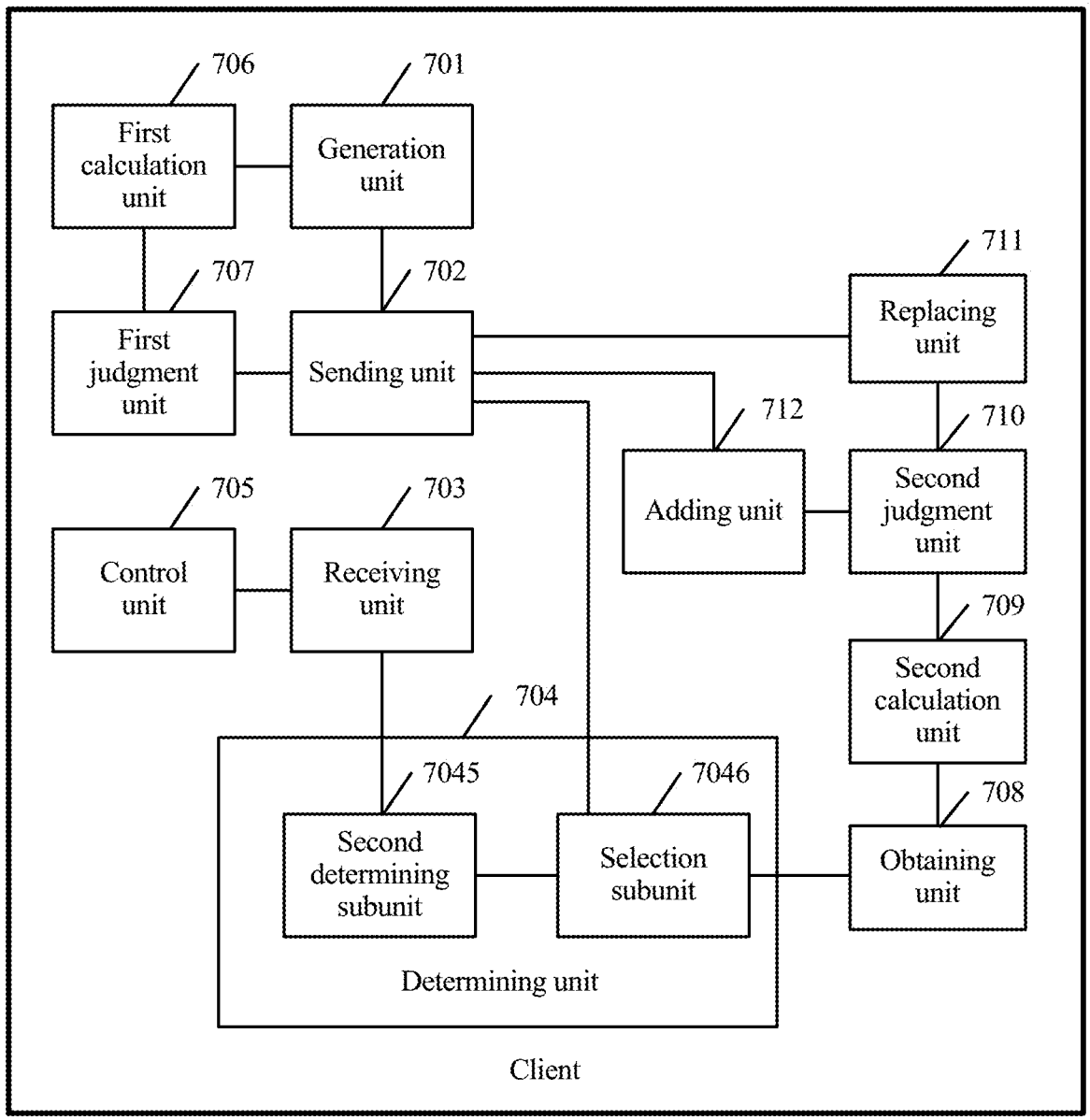
FIG. 11 is a schematic structural diagram of still another client disclosed in an embodiment of the present invention.

In an optional implementation, when the target data selection policy is the clustering-based selection policy, the target policy parameter is a quantity of clustered groups. Referring to FIG. 11, FIG. 11 is a schematic structural diagram of still another client disclosed in an embodiment of the present invention. The client may be configured to perform a data processing method disclosed in an embodiment of the present invention. The client shown in FIG. 11 is obtained by further optimizing the client shown in FIG. 8. In comparison with the client shown in FIG. 8, a determining unit 704 in the client shown in FIG. 11 may include a second determining subunit 7045, configured to determine a to-be-uploaded quantity of pieces of data in the data set according to the quantity of the clustered groups and a selection subunit 7046, configured to: select the to-be-uploaded quantity of pieces of data from the data set, and combine the data into the data subset.

In an optional implementation, when the client generates new data, the client shown in FIG. 11 may further include an obtaining unit 708, configured to obtain, from the data subset, all target data of which a generation time has an interval that is less than a preset time interval and that is from a generation time of the new data, a second calculation unit 709, configured to calculate similarity between all the target data and the new data to obtain maximum similarity and target data corresponding to the maximum similarity, a second judgment unit 710, configured to determine whether the maximum similarity is greater than a preset threshold and a replacing unit 711, configured to: when the second judgment unit 710 determines that the maximum similarity is greater than the preset threshold, replace the target data corresponding to the maximum similarity with the new data, so as to obtain a first data subset.

Correspondingly, a specific implementation in which the sending unit 702 sends the data subset to the server may be:

The sending unit 702 sends the first data subset to the server.

In an optional implementation, the client shown in FIG. 11 may further include an adding unit 712, configured to: when the second judgment unit 710 determines that the maximum similarity is not greater than the preset threshold, add the new data into the data subset to obtain a second data subset.

Correspondingly, a specific implementation in which the sending unit 702 sends the data subset to the server may be:

The sending unit 702 sends the second data subset to the server.

In this embodiment of the present invention, the client shown in FIG. 7 to FIG. 11 generates, before selecting data and sending the data to the server, a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption in a data processing process can be effectively reduced. In addition, representative data can be accurately and conveniently selected, so as to obtain a more accurate prediction model.

Figure 12:
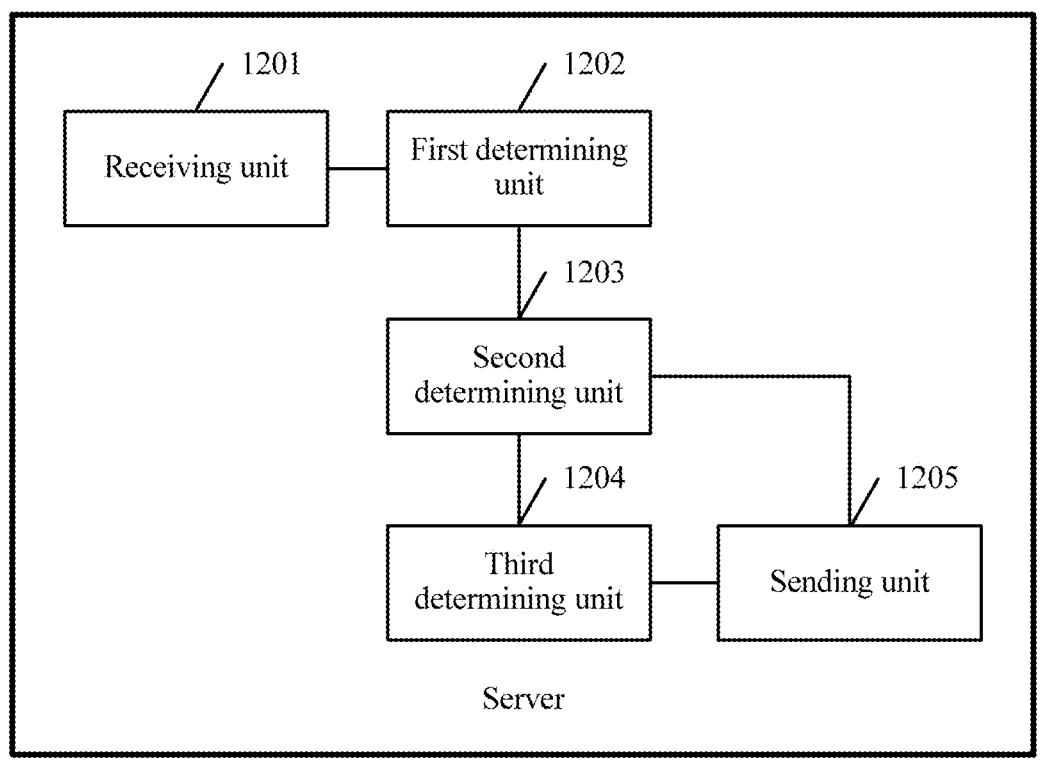
FIG. 12 is a schematic structural diagram of a server disclosed in an embodiment of the present invention.

Based on the network architecture shown in FIG. 1, an embodiment of the present invention discloses another server. Referring to FIG. 12, FIG. 12 is a schematic structural diagram of a server disclosed in an embodiment of the present invention. The server may be configured to perform a data processing method disclosed in an embodiment of the present invention. As shown in FIG. 12, the server may include a receiving unit 1201, a first determining unit 1202, a second determining unit 1203, a third determining unit 1204, and a sending unit 1205.

The receiving unit 1201 is configured to receive data digests sent by one or more clients.

In this embodiment of the present invention, one server may simultaneously establish a connection to one or more clients, so that the receiving unit 1201 may separately receive, in a same time period, data digests sent by multiple clients.

The first determining unit 1202 is configured to determine, from the one or more clients according to the data digests, a target client that is allowed to upload data.

In this embodiment of the present invention, there may be one or multiple target clients that are allowed to upload data.

The second determining unit 1203 is configured to determine a target data selection policy according to a data digest corresponding to the target client.

In this embodiment of the present invention, the target data selection policy may include but is not limited to at least one of a selection policy based on a confidence level, a sampling selection policy, a clustering-based selection policy, or the like. The sampling selection policy may include but is not limited to any one of a random sampling selection policy, an interval sampling selection policy, a stratified sampling selection policy, or the like.

The third determining unit 1204 is configured to determine a target policy parameter according to the data digest corresponding to the target client and the target data selection policy.

The sending unit 1205 is configured to send the target data selection policy and the target policy parameter to the target client, so that the target client determines a to-be-transmitted data subset according to the target data selection policy and the target policy parameter.

In this embodiment of the present invention, the target policy parameter is used to limit a quantity of pieces of data in the data subset.

The receiving unit 1201 is further configured to: receive the data subset sent by the target client, and establish a prediction model or update an existing prediction model according to the data subset.

In this embodiment of the present invention, the sending unit 1205 is further configured to send feedback information to a remaining client in the one or more clients except the target client. The feedback information is used to instruct the remaining client in the one or more clients except the target client to forbid sending data to the server.

Figure 13:
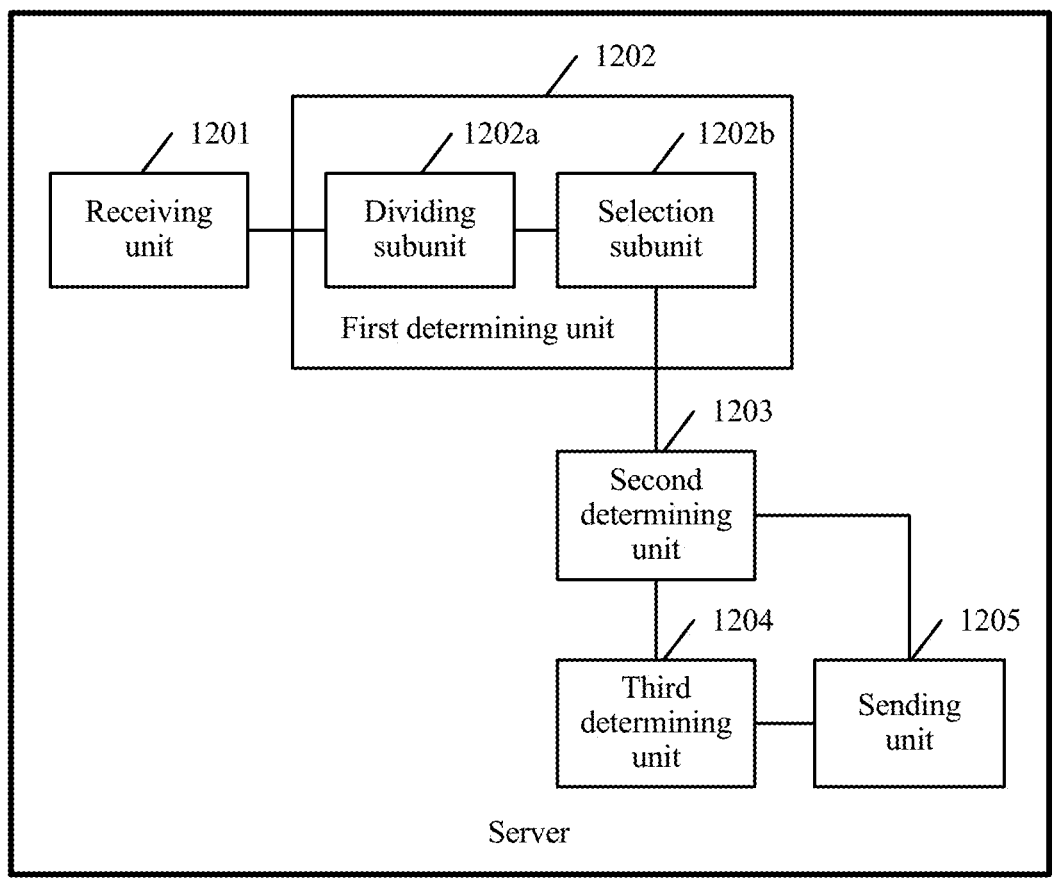
FIG. 13 is a schematic structural diagram of another server disclosed in an embodiment of the present invention.

Referring to FIG. 13, FIG. 13 is a schematic structural diagram of another server disclosed in an embodiment of the present invention. The server may be configured to perform a data processing method disclosed in an embodiment of the present invention. The server shown in FIG. 13 is obtained by further optimizing the server shown in FIG. 12. In comparison with the server shown in FIG. 12, a first determining unit 1202 in the server shown in FIG. 13 may include a classification subunit 1202a, configured to classify the one or more clients into multiple groups according to the data digests sent by the one or more clients and a selection subunit 1202b, configured to: select at least one client from each of the multiple groups, and use the at least one client selected from each group as the target client that is allowed to upload data.

Figure 14:
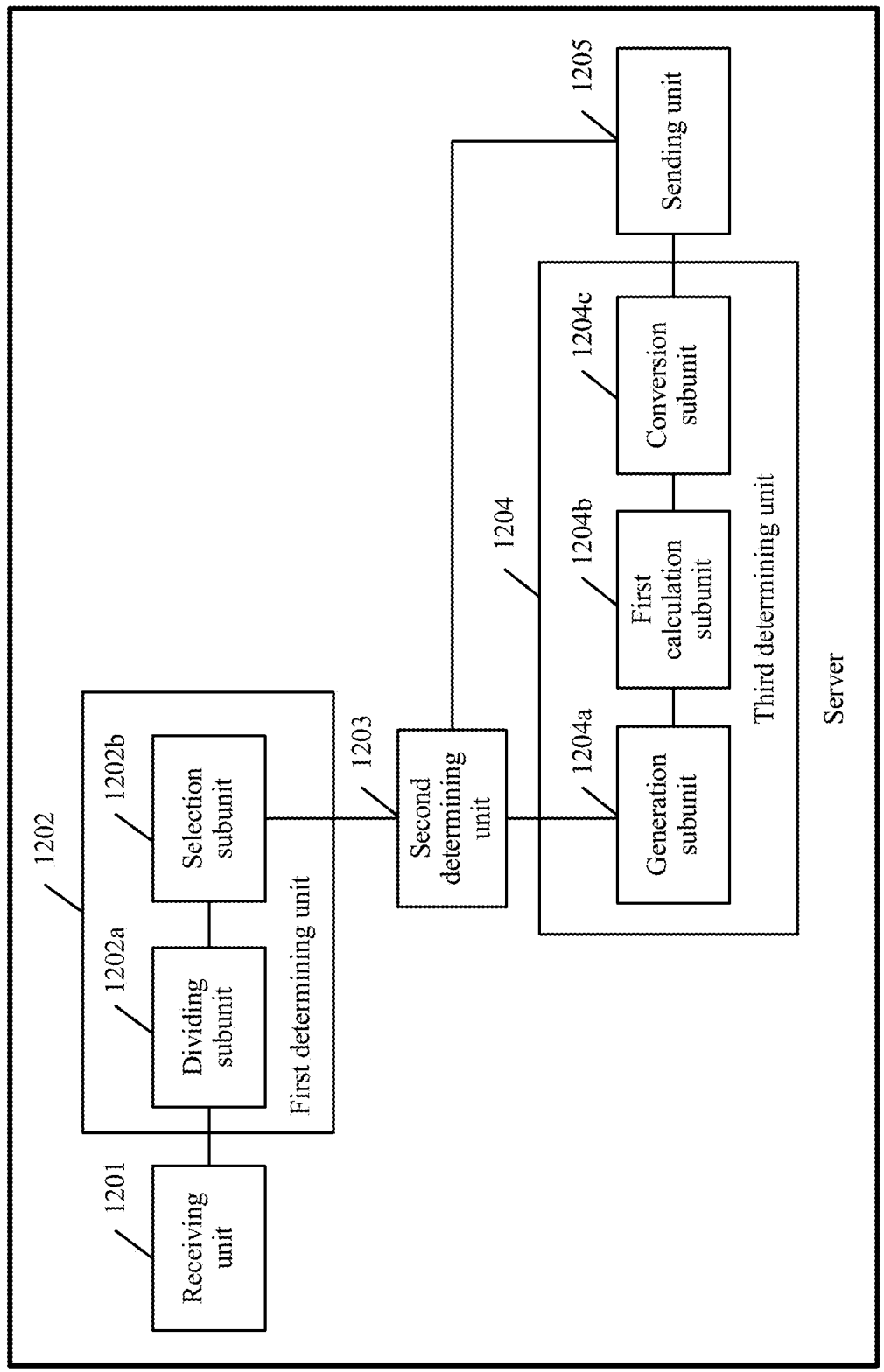
FIG. 14 is a schematic structural diagram of still another server disclosed in an embodiment of the present invention.

In an optional implementation, referring to FIG. 14, FIG. 14 is a schematic structural diagram of still another server disclosed in an embodiment of the present invention. The server may be configured to perform a data processing method disclosed in an embodiment of the present invention. The server shown in FIG. 14 is obtained by further optimizing the server shown in FIG. 13. In comparison with the server shown in FIG. 13, a third determining unit 1204 in the server shown in FIG. 14 may include a generation subunit 1204a, configured to generate a data digest corresponding to the server for a stored data set, a first calculation subunit 1204b, configured to calculate similarity between the data digest corresponding to the server and the data digest corresponding to the target client and a conversion subunit 1204c, configured to convert the similarity into the target policy parameter according to a conversion function corresponding to the target data selection policy.

Figure 15:
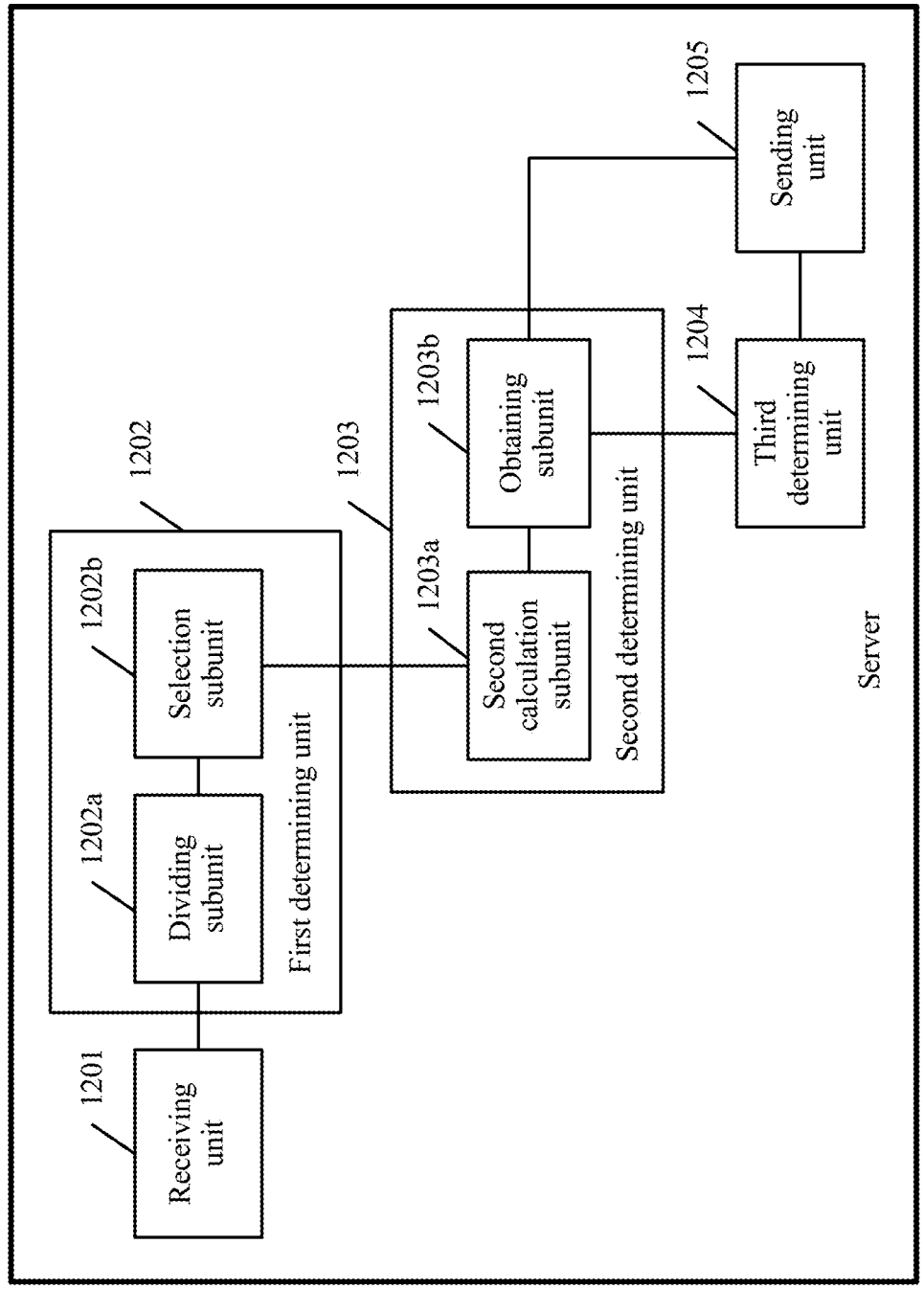
FIG. 15 is a schematic structural diagram of still another server disclosed in an embodiment of the present invention.

In an optional implementation, referring to FIG. 15, FIG. 15 is a schematic structural diagram of still another server disclosed in an embodiment of the present invention. The server may be configured to perform a data processing method disclosed in an embodiment of the present invention. The server shown in FIG. 15 is obtained by further optimizing the server shown in FIG. 13. In comparison with the server shown in FIG. 13, a second determining unit 1203 in the server shown in FIG. 15 may include a second calculation subunit 1203a, configured to calculate model variation amplitudes under different data selection policies by using the data digest corresponding to the target client, and according to a pre-established correspondence among a model variation amplitude, a historical data digest, and a data selection policy and an obtaining subunit 1203b, configured to: obtain a data selection policy corresponding to a maximum model variation amplitude in the model variation amplitudes that are calculated by the second calculation subunit 1203a under the different data selection policies, and use the data selection policy as the target data selection policy.

Correspondingly, a specific implementation in which the third determining unit 1204 determines the target policy parameter according to the data digest corresponding to the target client and the target data selection policy may be:

The third determining unit 1204 determines the target policy parameter by using the maximum model variation amplitude according to a correspondence between a model variation amplitude and a policy parameter under the target data selection policy.

In this embodiment of the present invention, the server shown in FIG. 12 to FIG. 15 first receives, before receiving data sent by the client, a data digest generated by the client and determines, according to the data digest, whether to allow the client to upload data, and determines a data selection policy and a policy parameter for the client. In this way, the client selects data according to the data selection policy and determines, according to the policy parameter, a quantity of pieces of data that need to be selected. Therefore, an amount of data transmitted by the client to the server can be controlled, and resource consumption of the server in a data processing process can be effectively reduced. In addition, representative data can be accurately and conveniently selected, so as to obtain a more accurate prediction model.

Figure 16:
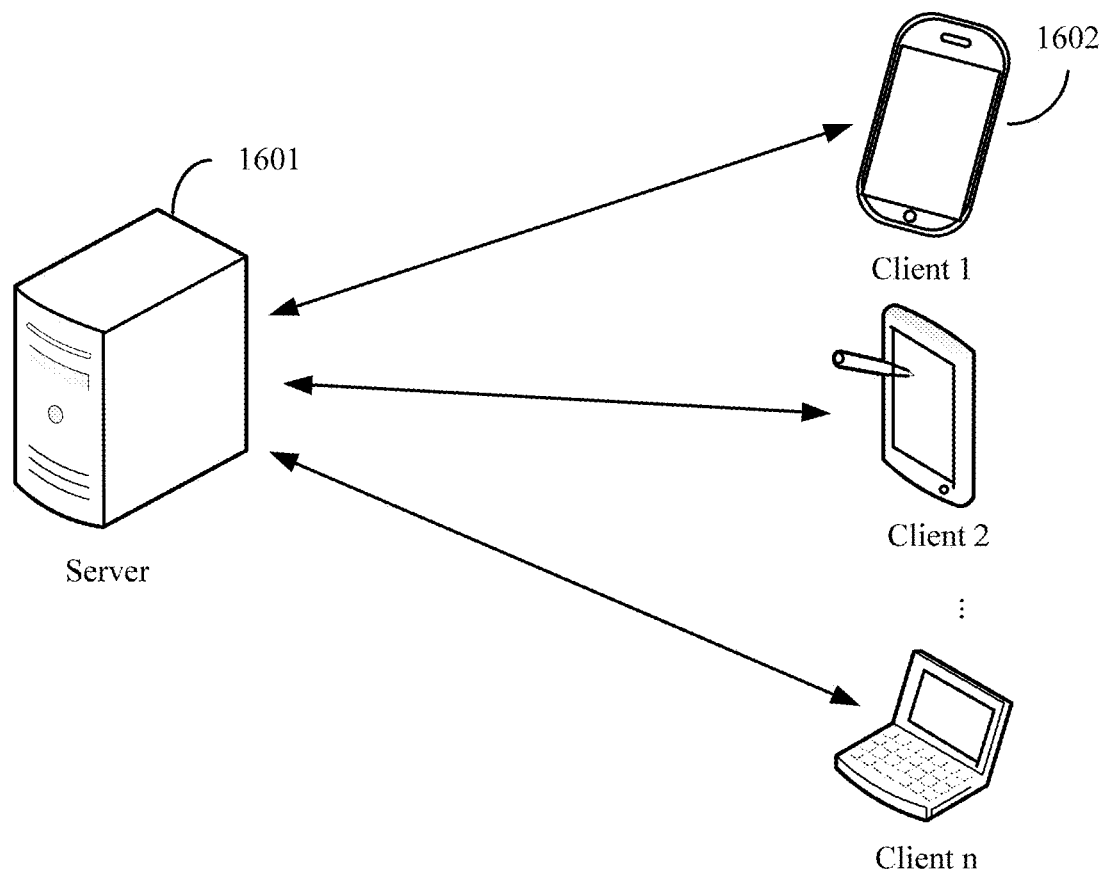
FIG. 16 is a schematic structural diagram of a data processing system disclosed in an embodiment of the present invention.

Based on the network architecture shown in FIG. 1, an embodiment of the present invention discloses a data processing system. Referring to FIG. 16, FIG. 16 is a schematic structural diagram of a data processing system disclosed in an embodiment of the present invention. As shown in FIG. 16, the data processing system may include a server 1601 and at least one client 1602. The server 1601 may establish a communication connection to the client 1602, and the client 1602 may include but is not limited to devices such as a smartphone, a tablet computer, a PDA, a smart watch, a smart band, and an intelligent surveillance camera.

The client 1602 is configured to: generate a data digest for a stored data set, and send the data digest to the server 1601.

The server 1601 is configured to determine, according to the data digest, whether the client 1602 is allowed to upload data.

The server 1601 is further configured to: after determining that the client 1602 is allowed to upload data, determine a target data selection policy according to a data digest corresponding to the client 1602, and determine a target policy parameter according to the data digest corresponding to the client 1602 and the target data selection policy.

The server 1601 is further configured to send the target data selection policy and the target policy parameter to the client 1602.

The client 1602 is further configured to: receive the target data selection policy and the target policy parameter, and determine a to-be-transmitted data subset according to the target data selection policy and the target policy parameter. The target policy parameter is used to limit a quantity of pieces of data in the data subset.

The client 1602 is further configured to send the data subset to the server 1601.

The server 1601 is further configured to: receive the data subset, and establish a prediction model or update an existing prediction model according to the data subset.

In this embodiment of the present invention, the server 1601 is further configured to: when determining that the client 1602 is not allowed to upload data, send feedback information to the client 1602. The feedback information is used to instruct the client 1602 to forbid sending data to the server 1601.

In this embodiment of the present invention, the target data selection policy may include but is not limited to at least one of a selection policy based on a confidence level, a sampling selection policy, or a clustering-based selection policy, or the like. The sampling selection policy may include but is not limited to any one of a random sampling selection policy, an interval sampling selection policy, a stratified sampling selection policy, or the like.

For another specific function of the server 1601 and the client 1602 in this embodiment of the present invention, refer to content in the foregoing embodiments, and details are not described herein again.

In this embodiment of the present invention, by implementing the data processing system shown in FIG. 16, before the client selects data and sends the data to the server, the client generates a data digest and sends the data digest to the server, and the server determines a data selection policy and a policy parameter that are suitable for the client. In this way, the client selects data according to the data selection policy and determines, according to the policy parameter, a quantity of pieces of data that need to be selected. Therefore, an amount of data transmitted by the client to the server can be controlled, and resource consumption of the server in a data processing process can be effectively reduced. In addition, representative data can be accurately and conveniently selected, so as to obtain a more accurate prediction model.

It should be noted that, for brief description, the foregoing method embodiments are represented as a series of actions. However, a person skilled in the art should appreciate that the present invention is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

In the foregoing embodiments, the description of each embodiment has respective focuses. For a part that is not described in detail in an embodiment, reference may be made to related descriptions in other embodiments.

A sequence of the steps of the method in the embodiments of the present invention may be adjusted, and certain steps may be merged or removed according to an actual requirement.

The units or subunits of a client and a server may be merged, divided, and removed in the embodiments of the present invention according to an actual requirement.

A person of ordinary skill in the art may understand that, all or some of the steps in each method of the foregoing embodiments may be implemented by a program instructing related hardware. The program may be stored in a computer readable storage medium. The storage medium includes a read-only memory (Read-Only Memory, ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer readable medium that can be configured to carry or store data.

The data processing method, the related device, and the system provided in the embodiments of the present invention are described in detail above. The principle and implementation of the present invention are described herein through specific examples. The description about the embodiments is merely provided to help understand the method and core ideas of the present invention. In addition, a person of ordinary skill in the art can make variations and modifications in terms of the specific implementations and application scopes according to the ideas of the present invention. Therefore, the content of this specification shall not be construed as a limitation on the present invention.

What is claimed is:

1. A data processing method comprising:
   sending, by a client, a data digest for a stored data set to a server, wherein the data digest is generated by the client;
   receiving, by the client, a target data selection policy and a target policy parameter sent by the server, wherein the target data selection policy is determined based on the data digest, and the target policy parameter is determined based on the target data selection policy and the data digest;
   determining, by the client, a data subset from the data set according to the target data selection policy and the target policy parameter; and
   sending, by the client, the data subset to the server.

2. The method according to claim 1, further comprising:
   calculating, by the client, similarity between the data digest and at least one historical data digest;
   determining, by the client, whether similarity exceeding a preset threshold exists in the calculated similarity; and
   sending, by the client, the data digest to the server when no similarity exceeding the preset threshold exists in the calculated similarity.

3. The method according to claim 1, wherein generating the data digest for a stored data set comprises:
   generating, by the client, data digest subsets corresponding to each type of data; and
   combining the data digest subsets corresponding to each type of data into the data digest when the data set comprises multiple types of data.

4. The method according to claim 1, wherein determining the data subset from the data set comprises:
   calculating, by the client, a confidence level of data in the data set according to a prediction model sent by the server;
   extracting, by the client from the data set, data whose confidence level is less than a confidence level threshold; and
   combining the data into the data subset when the target data selection policy is a selection policy based on the confidence level, the target policy parameter being the confidence level threshold.

5. The method according to claim 1, wherein determining the data subset from the data set comprises:
   determining, by the client, a sampling quantity of pieces of data in the data set according to a sampling proportion;
   extracting, by the client, the sampling quantity of pieces of data from the data set; and
   combining the data into the data subset when the target data selection policy is a sampling selection policy, the target policy parameter being a sampling proportion.

6. The method according to claim 1, wherein determining the data subset from the data set comprises:
   determining, by the client, a to-be-uploaded quantity of pieces of data in the data set according to a quantity of clustered groups;
   selecting, by the client, the to-be-uploaded quantity of pieces of data from the data set; and
   combining the data into the data subset when the target data selection policy is a clustering-based selection policy, the target policy parameter being a quantity of clustered groups.

7. The method according to claim 6, further comprising:
   obtaining, by the client from the data subset, all target data of which a generation time has an interval that is less than a preset time interval and that is from a generation time of new data when the client generates new data;
   calculating, by the client, a similarity between all target data and the new data to obtain a maximum similarity and target data corresponding to the maximum similarity;
   determining, by the client, whether the maximum similarity is greater than a preset threshold; and
   replacing, by the client, the target data corresponding to the maximum similarity with the new data so as to obtain a first data subset when the maximum similarity is greater than the preset threshold,
   wherein sending the data subset to the server comprises sending the first data subset to the server.

8. The method according to claim 7, further comprising adding, by the client, the new data into the data subset to obtain a second data subset when the maximum similarity is not greater than the preset threshold, wherein sending the data subset to the server comprises sending the second data subset to the server.

9. A data processing method comprising:
   receiving, by a server, data digests sent by one or more clients;
   determining, by the server, a target client from the one or more clients according to the data digests, wherein the target client is allowed to upload data;
   determining, by the server, a target data selection policy according to a data digest corresponding to the target client;
   determining a target policy parameter according to the data digest corresponding to the target client and the target data selection policy;
   sending, by the server, the target data selection policy and the target policy parameter to the target client so that the target client determines a to-be-transmitted data subset according to the target data selection policy and the target policy parameter;
   receiving, by the server, the data subset sent by the target client; and
   establishing a prediction model or updating an existing prediction model according to the data subset.

10. The method according to claim 9, wherein determining the target client from the one or more clients comprises:
    classifying, by the server, the one or more clients into multiple groups according to the data digests;
    selecting, by the server, at least one client from each of the multiple groups; and
    using the at least one client selected from each group as the target client that is allowed to upload data.

11. The method according to claim 9, wherein determining the target policy parameter comprises:
    generating, by the server, a data digest corresponding to the server for a stored data set;
    calculating, by the server, a similarity between the data digest corresponding to the server and the data digest corresponding to the target client; and
    converting, by the server, the similarity into the target policy parameter according to a conversion function corresponding to the target data selection policy.

12. The method according to claim 9, wherein determining the target data selection policy comprises:
    calculating, by the server, model variation amplitudes under different data selection policies by using the data digest corresponding to the target client, and according to a pre-established correspondence among a model variation amplitude, a historical data digest, and a data selection policy;
    obtaining, by the server, a data selection policy corresponding to a maximum model variation amplitude in the calculated model variation amplitudes under the different data selection policies; and
    using the data selection policy as the target data selection policy.

13. The method according to claim 12, wherein determining the target policy parameter comprises determining, by the server, the target policy parameter by using the maximum model variation amplitude and according to a correspondence between a model variation amplitude and a policy parameter under the target data selection policy.

14. A client comprising:
    a processor; and
    a non-transitory computer-readable storage medium configured to store a program for execution by the processor, the program including instructions to:
    send a data digest for a stored data set to a server, wherein the data digest is generated by the client;
    receive a target data selection policy and a target policy parameter sent by the server, wherein the target data selection policy is determined based on the data digest, and target policy parameter is determined based on the target data selection policy and the data digest;
    determine a data subset from the data set according to a target data selection policy and a target policy parameter; and
    send the data subset to the server.

15. The client according to claim 14, wherein the program further includes instructions to:
    calculate a similarity between the data digest and at least one historical data digest;
    determine whether the calculated similarity exceeds a preset threshold; and
    send the data digest to the server when the calculated similarity does not exceed the preset threshold.

16. The client according to claim 14, wherein the program further includes instructions to:
    generate data digest subsets corresponding to each type of data when the data set comprises multiple types of data; and
    combine the data digest subsets corresponding to each type of data into the data digest.

17. The client according to claim 14, wherein the program further includes instructions to:
    calculate a confidence level of data in the data set according to a prediction model sent by the server when the target data selection policy is a selection policy based on a confidence level, the target policy parameter being a confidence level threshold;
    extract, from the data set, data whose confidence level is less than the confidence level threshold; and
    combine the data into the data subset.

18. The client according to claim 14, wherein the program further includes instructions to:
    determine a sampling quantity of pieces of data in the data set according to sampling proportion when the target data selection policy is a sampling selection policy, the target policy parameter being the sampling proportion;
    extract the sampling quantity of pieces of data from the data set; and
    combine the data into the data subset.

19. The client according to claim 14, wherein the program further includes instructions to:
    determine a to-be-uploaded quantity of pieces of data in the data set according to a quantity of clustered groups when the target data selection policy is a clustering-based selection policy, the target policy parameter being the quantity of clustered groups;
    select the to-be-uploaded quantity of pieces of data from the data set; and
    combine the data into the data subset.

20. The client according to claim 19, wherein the program further includes instructions to:
    obtain, from the data subset, all target data of which a generation time has an interval that is less than a preset time interval and that is from a generation time of new data when the client generates the new data;

calculate a similarity between all the target data and the new data to obtain a maximum similarity and target data corresponding to the maximum similarity;

determine whether the maximum similarity is greater than a preset threshold; and replace the target data corresponding to the maximum similarity with the new data, so as to obtain a first data subset when the maximum similarity is greater than the preset threshold, wherein the instructions to send the data subset to the server comprises the instructions to send the first data subset to the server.

* * * * *